United States Patent

Yoshida et al.

[11] Patent Number: 5,844,786
[45] Date of Patent: Dec. 1, 1998

[54] DC-DC CONVERTER CIRCUIT AND INDUCTIVE LOAD DRIVER USING IT

[75] Inventors: Daisuke Yoshida, Hadano; Masao Hagiwara, Hiratsuka; Yasushi Kawaji, Yokohama, all of Japan

[73] Assignee: Komatsu Ltd., Tokyo, Japan

[21] Appl. No.: 836,127

[22] PCT Filed: Nov. 13, 1995

[86] PCT No.: PCT/JP95/02309

§ 371 Date: May 8, 1997

§ 102(e) Date: May 8, 1997

[87] PCT Pub. No.: WO96/15578

PCT Pub. Date: May 23, 1996

[30] Foreign Application Priority Data

Nov. 11, 1994 [JP] Japan ................................... 6-277948

[51] Int. Cl.$^6$ .......................... H02M 3/335; G05F 1/613
[52] U.S. Cl. ................... 363/21; 363/17; 363/20; 323/222; 323/282
[58] Field of Search ...................... 323/222, 282, 323/285, 286, 249; 363/21, 17, 16, 20

[56] References Cited

U.S. PATENT DOCUMENTS

| | | | |
|---|---|---|---|
| 3,771,040 | 11/1973 | Fletcher et al. | 321/2 |
| 4,346,340 | 8/1982 | Hackett-Jones | 323/249 |
| 4,675,797 | 6/1987 | Vinciarelli | 363/21 |
| 4,720,667 | 1/1988 | Lee et al. . | |

FOREIGN PATENT DOCUMENTS

| | | |
|---|---|---|
| 48-49425 | 6/1973 | Japan . |
| 51-49584 | 11/1976 | Japan . |
| 57-58986 | 4/1982 | Japan . |
| 6-233593 | 8/1994 | Japan . |
| 6-327238 | 11/1994 | Japan . |

OTHER PUBLICATIONS

International Search Report in PCT/JP95/02309 mailed Mar.5, 1996.
English translation of First Office Action in Peoples Republic of China No. 95196140.3, issued Mar. 26, 1998.

*Primary Examiner*—Peter S. Wong
*Assistant Examiner*—Rajnikant B. Patel
*Attorney, Agent, or Firm*—Varndell Legal Group

[57] ABSTRACT

An inductive load drive device comprising a DC—DC converter circuit which has a coil (L) and switch (Sw) in series with a power source (E) and a capacitor (C) provided in parallel with the switch (Sw). The DC—DC converter produces a high voltage by a procedure in which the switch (Sw) is closed to apply the power source voltage to the coil (L) and then the switch (Sw) is opened to transfer the magnetic energy stored in the coil (L) to the capacitor (C). Using a permanent magnet (Mg), a bias in the direction opposite to that of the magnetic flux induced by the current is applied to the magnetic core of the coil (L) so as to increase the magnetic energy stored in the coil (L). Thus, a DC—DC converter circuit in which a capacitor is efficiently charged through a small-sized coil is realized, and an inductive load drive device having a small size and a light weight is also realized.

27 Claims, 24 Drawing Sheets

5,844,786

DC-DC CONVERTER CIRCUIT AND INDUCTIVE LOAD DRIVER USING IT

TECHNICAL FIELD

The present invention relates to a DC—DC converter circuit and an inductive load driver using this DC—DC converter circuit; in particular, it relates to an inductive load driver using a DC—DC converter circuit to ensure a good rise characteristic of the load current by applying a voltage that is stepped up on commencement of drive of the inductive load driver.

BACKGROUND ART

In general, in order to operate an electromagnetic actuator such as a solenoid valve at high speed, it is necessary to achieve rapid rise of the exciting current, overcoming the inductance.

The transfer function G(S) of the exciting current I with respect to the applied voltage E when the internal resistance of the coil is R and its inductance is L is known to be:

$$G(S)=(1/R)\cdot(1/(1+L\cdot S/R)) \tag{1}$$

and, as is clear from this equation, the gradient of the rise of current immediately after application of voltage E in the condition where I=0 is E/L, while the steady current is E/R; it is known that first-order delay of time-constant L/R is produced.

Consequently, in order to achieve fast operation with a rapid rise in current in a coil of fixed R and L, it is necessary to employ a large applied voltage E. However, when the applied voltage is increased, the steady current also becomes larger than necessary, causing heat to be generated in the coil, which tends to cause burn-out or results in increased size of the device or waste of energy. Also, in the case of machines in for example a moving vehicle that are powered by a battery mounted in the vehicle, the voltage that can be applied is limited, so often sufficient voltage is not obtained.

In order to solve this problem, a voltage step-up circuit (e.g. a flyback DC—DC converter) for raising the voltage applied to the coil and a current control circuit for controlling the steady current have been provided, so as to achieve rapid increase of the current by applying high voltage on current rise, and preventing increase of the current by more than is necessary by using the current control circuit to suppress the applied voltage when the current reaches a prescribed value.

FIG. 31 shows an example of a conventional inductive load driver using a DC—DC converter of the flyback type as voltage step-up circuit. In this figure, 1 is a charger circuit comprising a flyback-type DC—DC converter.

One of the problems in using a flyback-type DC—DC converter as a voltage step-up circuit is the problem of efficiency and increased size of the device. Conventionally, a choke coil or transformer were often used as the inductance of the charger circuit in order to accumulate energy, but these suffered from the problem that they increased the size of the device and lowered the efficiency of the circuit.

In particular, in applications in which accumulation and discharge of energy to the coil is repeated at a high rate, as for example in a flyback type DC—DC converter or voltage step-up chopper, a semiconductor switch was employed as the switching means for accumulating the energy in the coil. However, the efficiency of the circuit was adversely affected by losses produced by the voltage drop on closure of this semiconductor switching means and switching losses in the opening/closing process. Furthermore, in addition to the volume of the ancillary devices needed to dissipate the heat generated by the device due to power loss in this semiconductor switching means, and the volume of the coils or transformer for the accumulation of this energy, the device as a whole tended to become larger and more complicated.

Also, in a DC—DC converter circuit as described above such as is currently being used for power supply to electronic devices, the effects on reliability of the device as a whole of ripple of the power source current consumed by the circuit present a problem.

The present invention is characterized in that, in a DC—DC converter circuit using a coil or transformer provided with a magnetic core in which a process is repeated whereby energy is introduced into the core from a power source and once energy has been accumulated in the core, the energy accumulated in the core is discharged to a load, the energy that is capable of being accumulated in this core is increased by magnetically biasing the core of the coil for energy accumulation in the opposite direction to the direction in which it is magnetized when the energy is introduced.

The fact that when energy is accumulated by a coil having a core the energy that is capable of being accumulated in the core can be increased by magnetic biasing of this core in the direction opposite to the magnetic field that is generated by the current that is passed when the energy is accumulated is disclosed in Japanese Patent Kokai Publication No. H.2-37705 and Japanese Utility Model Kokai Publication No. Sho.48-49425 etc. However, these all relate to ignition devices for internal combustion engines and do not solve the various problems involved in applications such as DC—DC converter circuits as described above.

Also, biasing the magnetic core of a transformer provided in a DC—DC converter circuit by means of a DC magnetic field is disclosed in Japanese Utility Model Kokai Publication No. Sho.57-58986, but this is an invention relating to a so-called forward type DC—DC converter: it has no effect in increasing the energy accumulated on the transformer and so does not solve the problems described above.

Thus, in conventional inductive load drivers, attempting to improve the rise characteristic of the inductive load, when using a flyback-type DC—DC converter, resulted in the problems of increased size and complexity of the device.

An object of the present invention is to provide a DC—DC converter circuit that solves all these problems and which is of small size and light weight and whose circuit construction is uncomplicated and efficient, and inductive load driver using this DC—DC converter circuit.

DISCLOSURE OF THE INVENTION

In order to achieve the above object, in a DC—DC converter circuit having a power source and a coil or transformer provided with a core connected to the power source, in which energy is accumulated on the core by applying the power source voltage to the coil or transformer and the energy accumulated on the core is then discharged to a load, this process being performed repeatedly, the DC—DC converter circuit of the present invention is characterized in that the magnetic energy accumulated on the coil or transformer is increased by magnetically biasing the core of the coil or transformer in the opposite direction to the direction of magnetization induced by the current supplied from the power source.

Further, in a DC—DC converter circuit comprising the power source, a coil having a core and connected to the power source, switching means that opens and closes a closed circuit containing the power source and the coil, rectifying means whereof one end is connected to the switching means with the object of preventing reverse current, and a capacitor connected in parallel with the switching means through the rectifying means, in which energy is accumulated on the coil by applying the power source voltage to the coil by closing the switching means, and the energy accumulated on the coil is accumulated on the capacitor and output through the rectifying means by opening the switching means with determined timing that may be determined arbitrarily, it is characterized in that the core of the coil is magnetically biased in the direction opposite to the magnetic field induced by the current supplied from the power source.

Further, in a DC—DC converter circuit comprising the power source, a first coil having a core and connected to the power source; switching means that opens and closes a closed circuit including the power source and the first coil; at least one second coil whose core is common with the first coil; rectifying means connected to one end of the second coils with the object of preventing reverse current; and capacitors respectively connected in parallel with the second coils through these rectifying means; wherein, by closing the switching means, the power source voltage is applied to the first coil, causing energy to be accumulated on the core of the first coil, and, by opening the switching means with timing that may be determined arbitrarily, the energy accumulated on the core is accumulated on the respective capacitors by currents induced in the second coils through the rectifying means, and is output, it is characterized in that the magnetic energy accumulated on the first coil is increased by magnetically biasing the core in the direction opposite to the magnetic field induced by the current supplied from the power source.

Further, in a DC—DC converter circuit comprising the power source, a coil connected to the power source and having a core, switching means that opens and closes a closed circuit containing the power source and the entire winding or a partial winding of the coil, rectifying means connected to one end of the entire winding or a partial winding of the coil with the object of preventing reverse current, and a capacitor connected in parallel with the entire winding or partial winding of the coil through this rectifying means, wherein closure of the switching means applies the power source voltage to the entire winding or partial winding of the coil, thereby accumulating energy on the core of the coil, and wherein, by opening the switching means with a timing that can be determined arbitrarily, energy accumulated on the core is accumulated on at least one of the capacitors as electrical energy induced in the entire winding or partial winding at least one location of the coil through the rectifying means, before being output, it is characterized in that the magnetic energy accumulated in the coil is increased by magnetically biasing the core in the opposite direction to the magnetic field induced by the current supplied from the power source.

Further, in a DC—DC converter circuit comprising the power source, a first coil connected to the power source and having a core, switching means that opens and closes a closed circuit containing the power source and the first coil, first rectifying means connected to at least one end of the switching means with the object of preventing reverse current, a first capacitor connected in parallel with the switching means through this first rectifying means, a second coil connected to the first capacitor, second rectifying means preventing reverse current of the current flowing through the second coil, and a second capacitor connected to the second coil through this second rectifying means, wherein closure of the switching means applies power source voltage to the first coil so that energy is accumulated on the core of the coil and, by opening the switching means with a timing that may be determined arbitrarily, the energy accumulated on the first coil is accumulated on the first capacitor through the first rectifying means and the energy that is output from the first coil, including the charge on the first capacitor is accumulated on the second capacitor through the second coil and second rectifying means before being output, characterized in that, by magnetically biasing the core of the first coil in the opposite direction to the magnetic field induced by the current supplied from the power source, the magnetic energy accumulated on the coil is increased.

Further, in a DC—DC converter circuit comprising the power source, a first coil having a core and connected to the power source, switching means that opens and closes the closed circuit containing the power source and the first coil, at least one second coil whose core is common to the first coil, first rectifying means connected to one end of the second coil with the object of preventing reverse current, first capacitors respectively connected in parallel with the second coils through these first rectifying means, a third coil connected to at least one of the first capacitors, second rectifying means that prevent reverse current of the current flowing through the third coil, and a third capacitor connected to the third coil through these second rectifying means; wherein, by closing the switching means, the power source voltage is applied to the first coil, thereby accumulating energy on the core of the first coil; the energy accumulated on the core by opening the switching means with timing that may be determined arbitrarily is accumulated on the respective first capacitors by means of the current induced in the second coil through the first rectifying means; and energy output from the second coil including the charge of the first capacitor is accumulated on the third capacitor through the third coil and second rectifying means; it is characterized in that by magnetically biasing the core in the direction opposite to the magnetic field induced by the current supplied from the power source, the magnetic energy accumulated on the first coil is increased.

Further, in a DC—DC converter circuit comprising the power source, a first coil connected to the power source and having a core, switching means that opens and closes a closed circuit including the power source and the entire winding or a partial winding of the first coil, first rectifying means connected to one end of the entire winding or partial winding of the coil with the object of preventing reverse current, first capacitors connected in parallel with the entire winding or partial winding of the coil through these first rectifying means, a second coil connected to at least one of the first capacitors, second rectifying means preventing reverse current of the current flowing through the second coil, and second capacitors connected to the second coil through the second rectifying means; wherein closure of the switching means applies the power source voltage to the entire winding or partial winding of the coil, causing energy to be accumulated on the core of the coil, and wherein the energy accumulated on the core by opening of the switching means with a timing that can be determined arbitrarily is accumulated on at least one of the first capacitors as electrical energy induced in the entire winding or at least one location of the partial winding of the first coil through the first rectifying means, and the energy that is output from the first coil, including the charge of the first capacitors, through the second coil and second rectifying means, is accumulated on the second capacitors and output; it is characterized in that the magnetic energy accumulated on the first coil is increased by magnetically biasing the core of the first coil in the opposite direction to the magnetic field induced by the current supplied from the power source.

The magnetic bias may be effected by means of a permanent magnet provided on the core or by supplying a desired current from a constant-current source to a biasing coil provided on the core.

Further, it is characterized by the provision of: the power source, the DC—DC converter circuit that generates a voltage higher than the power source and is connected to the power source, and high voltage switching means for applying to an inductive load the output of the DC—DC converter circuit.

Further, in an inductive load drive device comprising a power source, a DC—DC converter circuit 1 that is connected to the power source and that generates a voltage higher than the power source voltage, high voltage switching means that switches on or off the output of the DC—DC converter circuit, a logical summation circuit that is capable of driving the high voltage switching means in response to any of the at least one high voltage switch drive signals that it inputs, at least one high voltage distributive switching means for connecting the output of the high voltage switching means to at least one inductive load, a low voltage power source connected to the power source and that outputs a variable output voltage at or below the power source voltage, load current detecting means that detects load current flowing in the inductive load, at least one analogue constant-current output circuit connected to the low voltage power source, that inputs a holding current value signal and a load current feedback signal from the load current detecting means, and that controls the load current to a value matching the holding current value signal, a low voltage power source adjustment circuit that inputs the voltage drop amount of output means of this analogue constant-current output circuit and that generates a signal to lower the output voltage of the low voltage power source circuit if this voltage drop amount exceeds a prescribed value, at least one low voltage distributive switching means for connecting the output of the analogue constant-current output circuit to the at least one inductive load, and at least one surge absorption means that absorbs the self-induction energy of the load generated when the drive current of the at least one inductive load is reduced, and a signal processing circuit that inputs at least one load drive signal and, in respect of these respective load drive signals, during a prescribed fixed period from a time point signifying the commencement of the load drive in question, outputs a high voltage switch drive signal for driving the high voltage switching means and a drive signal of the high voltage distributive switching means for connecting the output of the high voltage switching means to the load that is to be driven, which is determined by the load drive signal and, during a period for which the load drive signal that is input signifies continuance of load drive, outputs a prescribed holding current value signal to the analogue constant-current output circuit and, concurrently, outputs a drive signal of the low voltage distributive switching means for connecting the output of the analogue constant-current output circuit to the load that is to be driven, which is determined in accordance with the load drive signal.

In this invention, the operating point is shifted by applying bias to the magnetic field of the coil. By this means, the energy density per unit area of the magnetic core can be raised, and the energy accumulated in the coil can thereby be increased. Consequently, by using a comparatively small coil, a DC—DC converter of small size and high efficiency can be obtained, and, by using such a DC—DC converter, an inductive load driver of high efficiency can be obtained.

BEST MODE FOR CARRYING OUT THE INVENTION

Embodiments of the DC—DC converter circuit and inductive load driver using this DC—DC converter circuit according to the present invention are described below with reference to the drawings.

FIG. I shows a first embodiment of a DC—DC converter circuit according to the present invention.

The operation of this circuit will be described with reference to the drawings. Capacitor C is charged with power source voltage by a power source E. A closed circuit A is then formed by closing a switch Sw. At this point, the charge accumulated on capacitor C is prevented from flowing back by rectifying means D, and so is held on capacitor C. The power source voltage E is also applied to inductance L, thereby increasing the current of closed circuit A. Energy is accumulated in the core of inductance L with increase in this current.

Next, when switch Sw is opened, with a timing that can be selected, closed circuit A is released, but, since inductance L acts so as to try to maintain the current by means of its self-inductance, the circuit current flows through the closed circuit B comprising inductance L, rectifying means D and capacitor C, so that the energy accumulated in inductance L is charged on to capacitor C.

By repetition of this action, capacitor C is gradually charged up to high voltage. Reverse flow of the voltage accumulated on capacitor C is prevented by the rectifying means D, so this voltage continues to rise every time energy is supplied from inductance L, so a voltage higher than the source voltage can be obtained.

When the voltage of capacitor C exceeds the desired value, this is detected by means for voltage detection, not shown, and the opening and closing of switch Sw is stopped; if, during the stoppage of opening and closing of switch Sw, the value of the voltage gets less than the desired value, opening and closing of switch Sw is recommended.

In this embodiment, a permanent magnet Mg is used to apply a magnetic bias to the core of inductance L for charging capacitor C, this bias being applied in the opposite direction to the magnetic field generated by the current supplied from the power source: more energy can thereby be accumulated by inductance L in a single current passage cycle.

Figure 2:
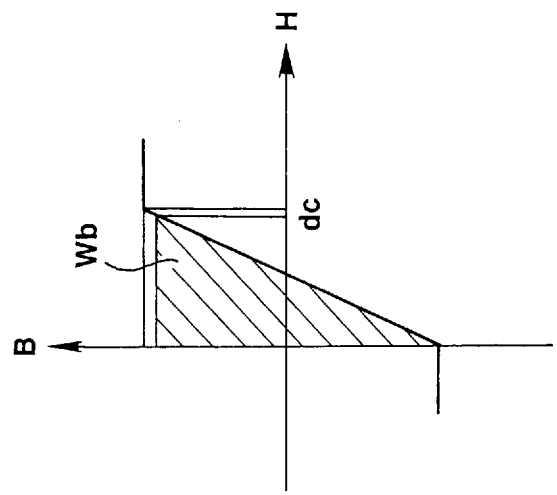
FIG. 2 is a diagram showing how the energy density is raised by applying bias to the core.
Figure 2:
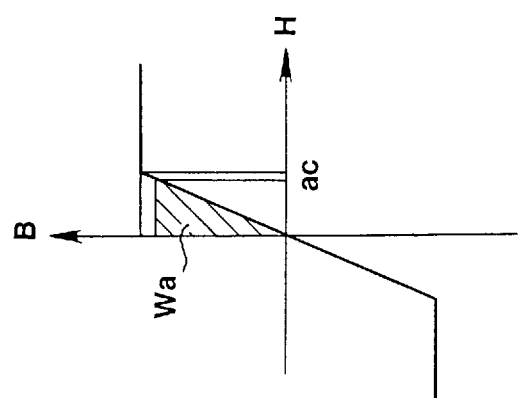
Figure 2:
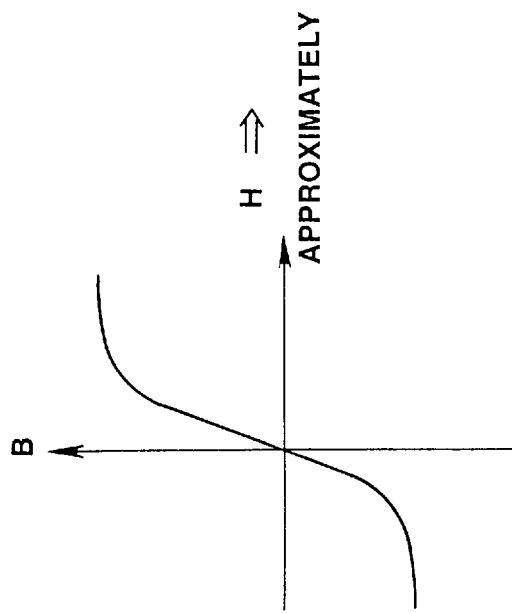

The principle of this will now be described with reference to FIG. 2. A typical B-H curve of a coil is shown in FIG. 2(*a*). In order to simplify this Figure, the magnetic hysteresis characteristic possessed by the core is omitted. Also, for purposes of explanation, FIG. 2(*b*) shows a simplified version of this Figure, paying special attention to the saturation characteristic of the core.

When now a current IL(A) flows in this coil, a magnetomotive force a is applied by the winding, so that energy Wa is accumulated on the core.

If, in this process, the current IL is increased with the object of increasing this accumulated energy Wa, thereby increasing the magnetomotive force a, once the saturation point c of the core is exceeded, further increase of the accumulated energy is undesirable. Furthermore, with saturation of the core of the coil, the current, which had hitherto increased according to the relationship IL=E/L·t (where L is the inductance at magnetic field 0 shown in FIG. 2(*b*)), due to the abrupt decrease of the inductance, shows an abrupt increase in rate of current increase per unit time, which may risk causing the destruction of the switching means etc.

Next, the B-H characteristic when magnetic bias is applied in the direction opposite to the direction of excitation by the current IL of the core of this coil is shown in FIG. 2(*c*).

In FIG. 2(*c*), when no current is flowing in the coil, due to the bias magnetic field, the core is in a practically saturated condition in the opposite direction to the magnetic flux that is excited by current IL. When, in this condition, a current IL passes in the coil, energy Wb shown in the Figure is accumulated on the core.

If in this condition the current is increased to the saturation point c of the core, it is clear from the Figure that the energy Wb which is accumulated is four times the accumulated energy Wa obtained in the case where the coil core is not biased.

This relationship will be described in more detail with reference to FIG. 3 to FIG. 6.

In FIG. 3 to FIG. 6, for simplicity of description, real numbers are employed, and the capacity of the energy storage capacitor is taken as being infinitely large i.e. it is viewed as a voltage source. In an actual DC—DC converter circuit, the terminal voltage of the energy storage capacitor fluctuates, but this does not impair the effect of the present invention.

Figure 1:
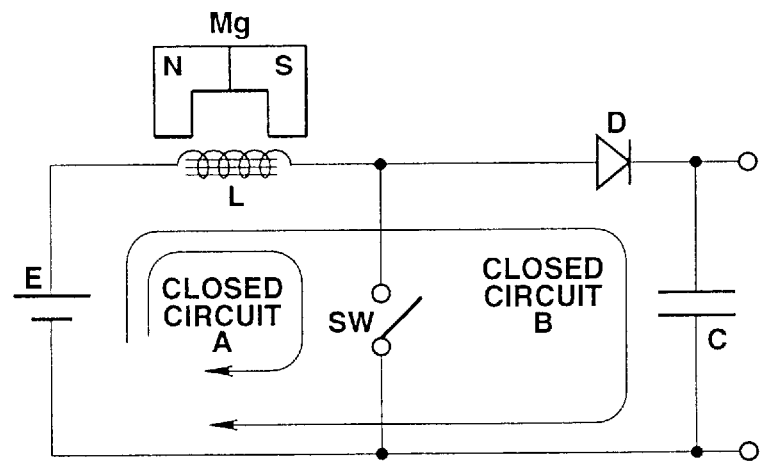
FIG. 1 is a circuit diagram showing an embodiment of a DC—DC converter circuit according to the present invention.
Figure 3:
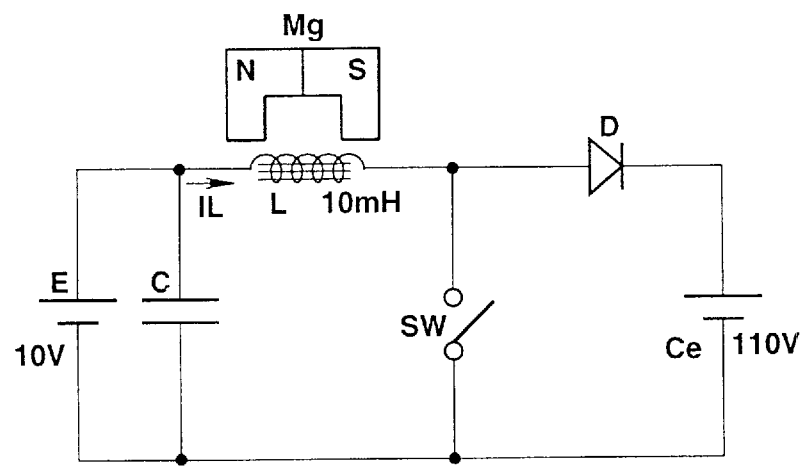
FIG. 3 is a circuit diagram showing a specific example of an embodiment of a DC—DC converter circuit according to the present invention shown in FIG. 1.

FIG. 3 shows a circuit diagram of the DC—DC converter circuit. Capacitor C that is connected in parallel with power source E is a filter capacitor for absorbing ripple of the power source current consumed by the circuit.

Figure 4A:
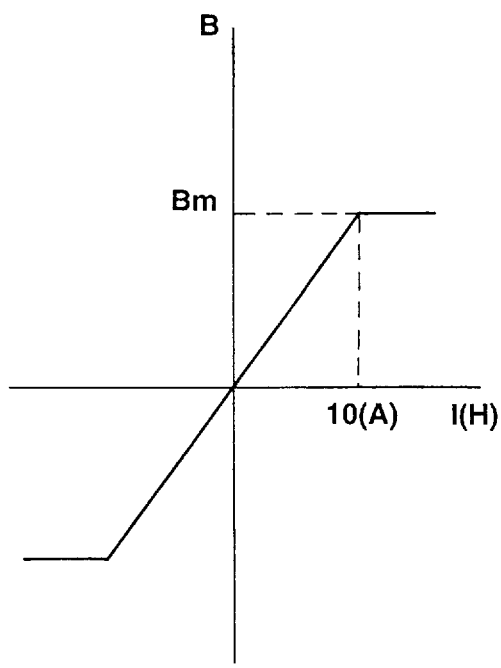
FIGS. 4(a) and 4(b) are diagrams showing the B-H characteristic of the core of a coil, and the operating current characteristic in a prior art example.
Figure 4B:
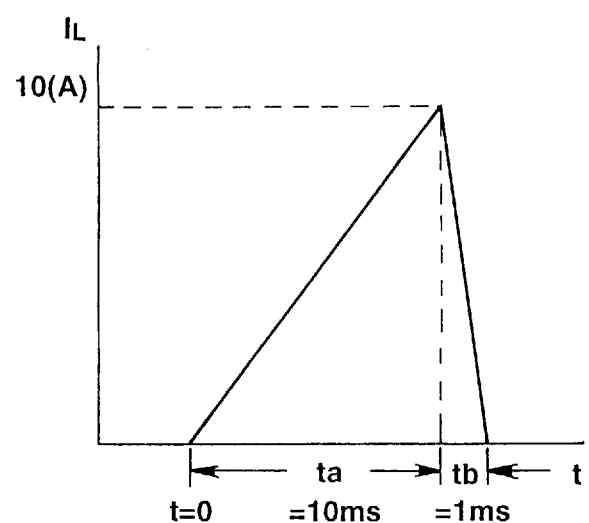

Now, FIG. 4(*a*) shows the B-H characteristic when no magnetic bias is applied to the core of coil L. For convenience, it will be assumed that the inductance of this coil L is 10 Mh, and that the core of coil L is magnetically saturated when a current 10 A is passed through the coil.

The operating current of this DC—DC converter when no magnetic bias is applied is shown in FIG. 4(*b*).

When switching means Sw is closed at time point t=0, the coil current IL is:

IL=E/L·t i.e. it increases with a gradient of 1000 A/sec, reaching the saturation point current 10 A of the coil in 10 msec.

At this point, the energy supplied to the coil from the power source is ½·(10 A)·(10 V)·(10 msec)=0.5 J.

Next, when switching means Sw is released at this time point, the circuit becomes a closed circuit consisting of power source E, coil L, rectifying means D, and output-side voltage source Ce.

If now the voltage of the output-side voltage source Ce is taken as 110 V, and it is assumed that there is no voltage drop at rectifying means D, a voltage of 100 V of opposite polarity to the direction of this current flow will be applied to coil L, so $$IL=IL(MAX)-100/L \cdot t$$

i.e. it decreases at a rate of 10000 A/sec.

Since IL (MAX)=10 Ma, the coil current after 1 msec is 0 A. Thus, in this process, energy ½·(10 A)·(100 V)·(1 msec)=0.5 J is discharged on the output side. In fact energy of {½·(10 A)·(10 V) ·(1 msec)} is present, transmitted directly to the output side from the power source at this point; however, in this connection we are concerned with the accumulation of energy by the coil and, since the energy term that is directly transmitted to the output side from this power source does not directly relate to the essence of the present invention, description concerning this energy is omitted; this treatment will be continued in the description below.

The time required for the accumulation and discharge of this energy is the sum of the time ta=10 msec for the accumulation of energy of the coil and the time tb=1 msec for the discharge of energy from the coil i.e. 11 msec. This circuit is therefore capable of supplying energy of 0.5 J to the output from the power source in a period of 11 msec.

The case where the same coil is employed but its core is magnetically biased will now be described.

Figure 5A:
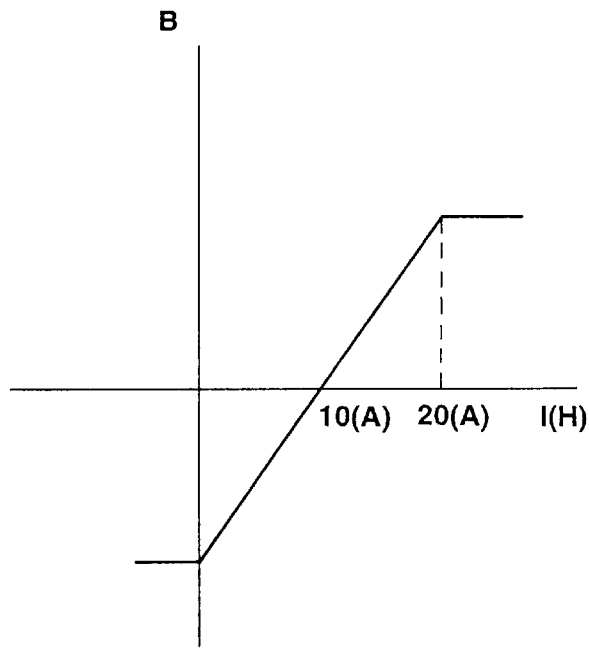
FIGS. 5(a) and 5(b) are diagrams showing the B-H characteristic of the core in the embodiment shown in FIG. 3 and its operating current characteristic.

FIG. 5(a) shows the characteristic of this biased coil.

When a permanent magnet is used to apply bias, there would normally be an increase in the value of the inductance and the saturation magnetic flux amount, because of the addition of the magnetic body constituted by the permanent magnet to the core of the coil; however, in this case, these effects are either absent or can be described in terms of the case where magnetic bias is applied by passing a constant current to a second winding, not shown.

In other words, in this case, the inductance does not change and the saturation characteristic of the core is also unchanged, so, as shown in FIG. 5(a), the characteristic of this coil simply consists of a characteristic obtained by shifting the characteristic of FIG. 4(a) in parallel to the right.

Figure 5B:
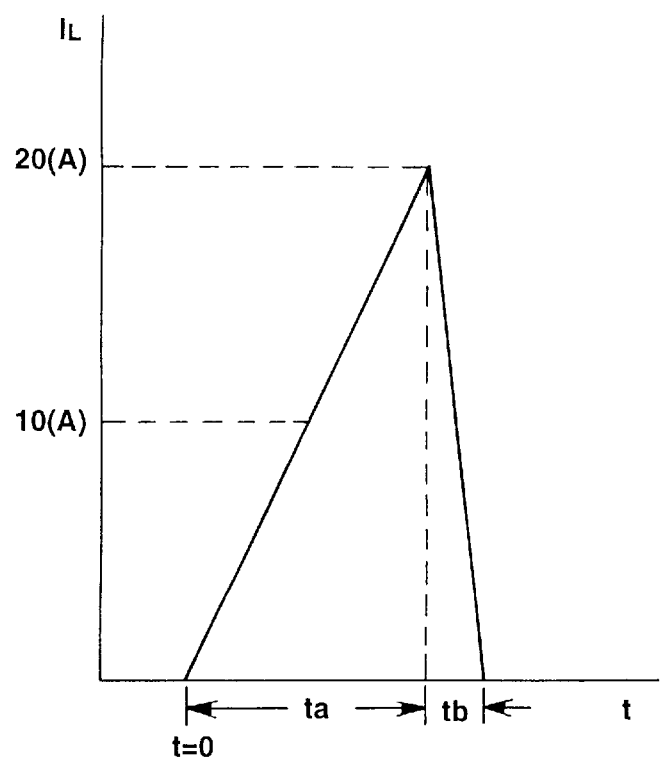

When switching means Sw is then closed, power source E is applied to coil L as described above, increasing the coil current IL by 1000 A/sec. When this coil current IL is increased to the saturation point of the core as described above, IL (MAX) at this point is 20 A, and the time required for the increase in current is then 20 msec. This process is shown in FIG. 5(b). Also, the energy accumulated on the coil during this process is ½·(20 A)·(10 V)·(20 msec)=2.0 J which is four times the energy accumulated on the coil if bias is not applied as described above.

When, at this time point, switching means Sw is opened, just as described above, the coil current decreases at the rate 10000 A/sec, becoming 0 A after 2 msec. During this period, the energy discharged by this coil is ½·(20 A)·(100 V)·(2 msec)=2.0 J and, since, in FIG. 5(b), ta=20 msec and tb=2 msec, energy of 2.0 J can be supplied on the output side from the power source in 22 msec.

Thus, compared with the case described above where an unbiased coil is employed the amount of energy passing through the circuit per unit time is doubled.

What is important in a DC—DC converter circuit is not the amount of energy accumulated in the coil per cycle, but rather the amount of energy that can be handled by the circuit in unit time. Further explanation concerning this point will now be given.

Let us now consider the objective to be increasing the amount of passage of energy per unit time of DC—DC converter circuits having cores of identical volume. A method of solving this problem which has been known for a long time is to reduce the value of the inductance.

Figure 6A:
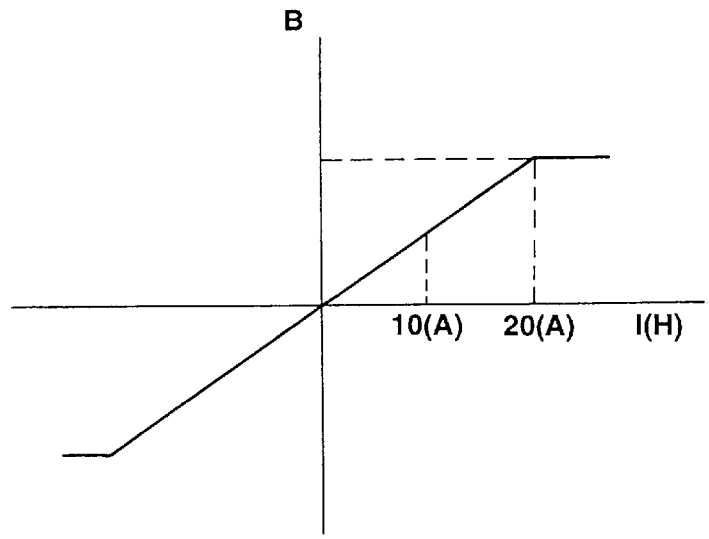
FIGS. 6(a) and 6(b) are diagrams showing the B-H characteristic of the core of a coil, and the operating current characteristic when the number of windings of the coil is halved in a prior art example.

FIG. 6(a) shows an inductance characteristic based on this principle. In this example, a coil is assumed wherein the number of windings wound on the core is reduced by half from that of the preceding example. If this is done, the current that can be passed at the saturation point of the core is doubled and the inductance is reduced by a factor of ¼.

The operation will now be described using the circuit of FIG. 3 in which such a coil is employed. When switching means Sw is closed at time t=0, the power source voltage E is applied to coil L, causing the coil current to increase in accordance with IL=E/L·t. Since the inductance of coil L is ¼ of the above value i.e. 2.5 Mh, this current increases at the rate 4000 Ma/sec. Furthermore, the coil current at the saturation point of the core of this coil is twice what it was in the above example, i.e. it is 20 A. The time required for excitation up to saturation of this coil is therefore (20 A)/(4000 Ma/sec)=5 msec.

The energy accumulated on the coil during this period is

½·(20 A)·(10 V)·(50 msec)=0.5 J

Figure 6B:
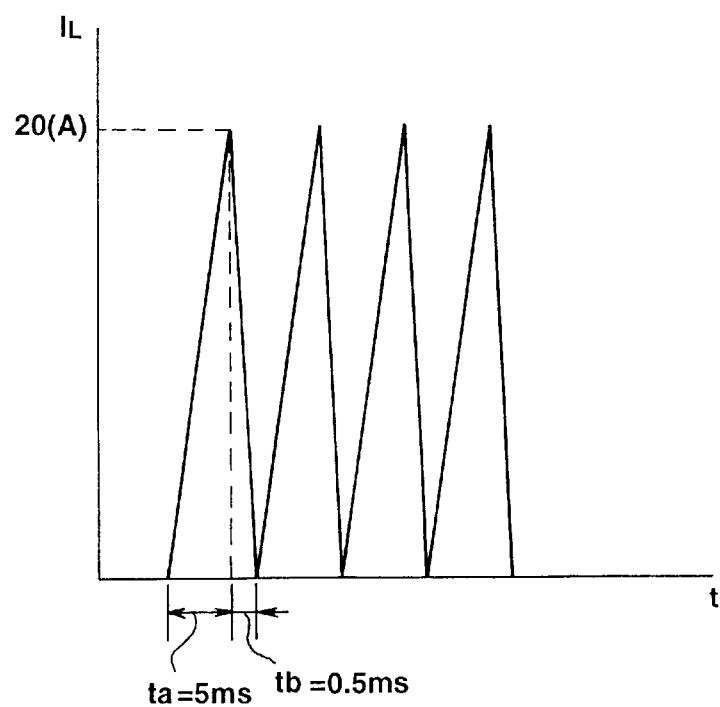

Also, since the value of the inductance is 2.5 Mh, the rate of decrease of the coil current at this time point when switching means Sw is opened becomes 40000 A/sec, so the current of 20 A becomes 0 A after 0.5 msec. Also, the energy hat coil L supplies to the output during this period is ½·(20 A)·(100 V)·(0.5 msec)=0.5 J As shown in FIG. 6(b), this means that the time required to accumulate the energy on this coil is ta=5 msec and the time required to discharge this at the output is tb=0.5 msec, making a total of 5.5 msec required by the circuit for transmission of energy of 0.5 J from the power source to the load. By repeating this operation four times, the same amount of energy in the same amount of time as in the case where the biased coil described above was used can be supplied from the power source to the load.

This means that the amount of energy transmitted per unit time using the same core can be increased. In applications such as DC—DC converters, it is desirable that as much energy as possible should be transmitted per unit time.

However, if, using such an unbiased coil, the value of the inductance is decreased, with the same maximum current as in the case of using a biased coil, switching means Sw employed in the circuit of FIG. 3 must be turned off with a frequency that is four times greater; particularly if a small core is employed in order to reduce the overall size, switching loss at this switching means Sw becomes non-negligible. The method according to the present invention, wherein a biased coil is employed is thus superior in that it results in lower switching loss than a method in which the value of the inductance is decreased.

Figure 7A:
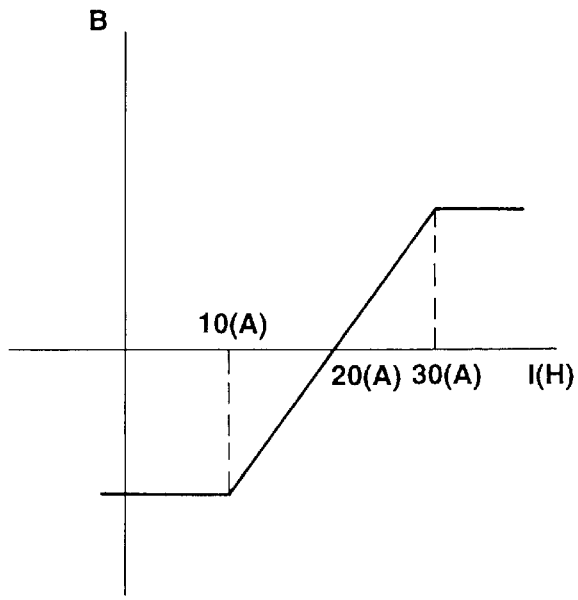
FIG. 7(a) and 7(b) are diagrams showing the B-H characteristic of the core and operating current characteristic when the magnetic bias is further increased in he embodiment shown in FIG. 3.

In the example of FIG. 5, in biasing the core of the oil, the biasing value is selected at which the core is magnetically saturated by itself in exactly the opposite direction in the condition where no coil current is being passed. What happens if this magnetic biasing value is made even deeper is described with reference to FIG. 7. FIG. 7(a) shows the B-H characteristic in this case.

The coil is of 10 Mh just as in the case of the example of FIG. 4 and FIG. 5; for the magnetic biasing value, a value is selected such that magnetic saturation is achieved in the opposite direction by a coil current of 10 A. The behavior of such a coil will now be described when the circuit of FIG. 3 is adopted for the coil L.

If now switching means Sw is closed, power source voltage is applied to coil L, but, since the core is saturated in the reverse direction whilst the current is still small, the value of the inductance is very small and as a result the coil current increases rapidly, reaching 10 A practically instantaneously. Let the value of the current under these conditions be taken as the minimum current value IL (MIN) for which the coil L can take the prescribed inductance value. Thereafter, the coil current increases in accordance with IL=IL (MIN)+E/L·t, until it reaches the saturation point in the direction of the magnetic field produced by the current.

Since the volume of the core of this coil and the number of windings of the coil are the same as in the case of the example of FIG. 4 and FIG. 5, the coil current at the saturation point is 30 A. The time from closure of switching means Sw until the current reaches this saturation point is (30 A−10 A) / (1000 A/sec)=20 msec.

Furthermore, the energy supplied during this period from the power source to the coil L is ½·(10 A+30 A)·(10 V)·(20 msec)=4.0 J.

In the process in which switching means Sw is then opened from this condition so that the energy accumulated in coil L is discharged at the output, the voltage in the opposite direction applied to coil L by output-side voltage source Ce is 100 V, and the rate of decrease of the coil current of this coil L is 10000 A/sec. The initial current of 30 A therefore drops to 10 A after 2 msec. When the current value gets below 10 A, as described above, the core of coil L is magnetically saturated in the reverse direction, so the coil current is immediately decreased to 0 A. In this process, the energy discharged by coil L on the output side is ½·(30 A+10 A)·(100 V)·(2 msec)=4.0 J.

Figure 7B:
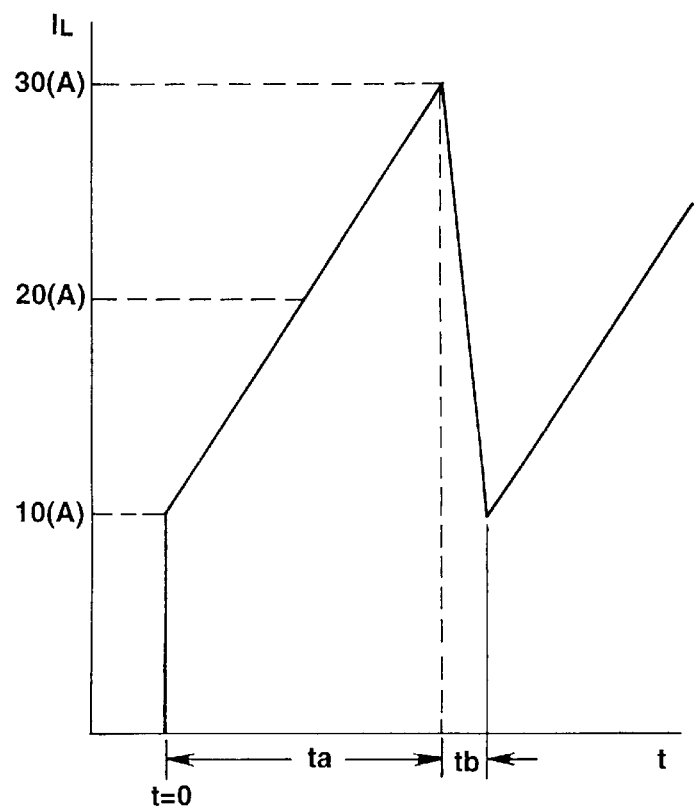

The way in which the current changes during this period is shown in FIG. 7(b).

After switching means Sw is closed at t=0, the time required for energy of 4.0 J to be accumulated in coil L is ta=20 msec, and the time required for the accumulated energy to be discharged is tb=2 msec i.e. the circuit can transmit energy of 4.0 J from the power source to the output in 22 msec.

Figure 8:
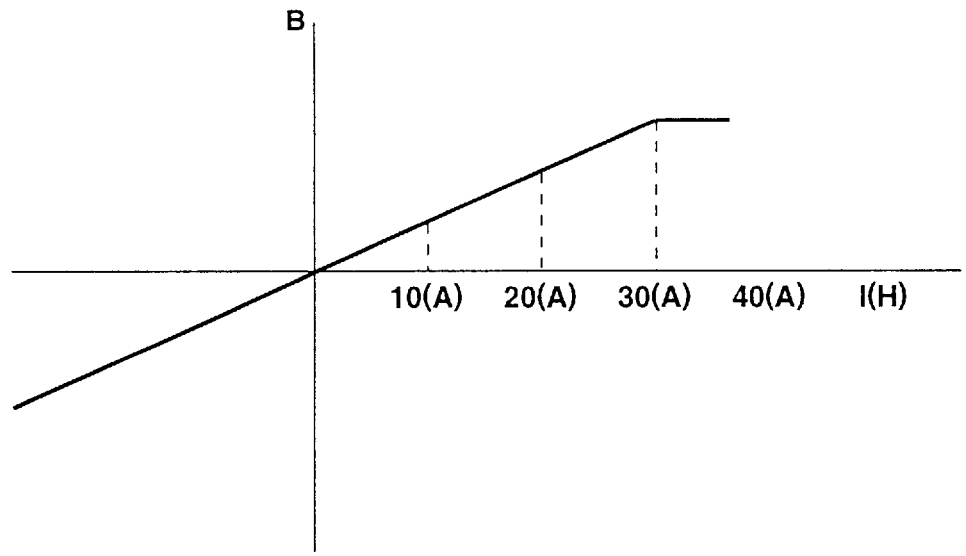
FIG. 8 is a diagram showing the operating current characteristic of a coil when the number of windings of the coil is reduced by a factor of ¼ in a prior art example.

Attempting to achieve this with an unbiased coil, if an identical core were used, would mean that a coil of ¼ the number of windings would need to be employed. Its inductance characteristic would be as shown in FIG. 8.

Since its number of windings is ¼, the current at saturation point of this core would be 40 A and its inductance would be 1/16 i.e. 0.625 Mh. The operation obtained when such a coil was applied to the circuit of FIG. 3 will now be described.

If now the switching means Sw is closed at t=0, the coil current rises in accordance with IL=E/L·t with a rate of increase of 16000 A/sec. Since the current value at the saturation point of this coil is then 40 A, the time required to reach this is 40 A/16000 A/sec=2.5 msec. In this process, the energy supplied from the power source to the coil is ½·(40 A)·(10 V)·(2.5 msec)=0.5 J.

Also, if we assume that the energy accumulated on this coil is discharged at the output side by opening switch Sw at this time point, the rate of decrease of the coil current during this process is 160000 A/sec and the discharge time is 0.25 msec. Thus the energy discharged at the output side during this period is ½·(40 A)·(100 V)·(0.25 msec)=0.5 J.

Thus, the circuit was able to transmit from the power source to the output side energy of 0.5 J in a period of 2.75 msec. Thus, by repeating such accumulation of energy on to the coil and discharge at the output eight times, the same amount of energy can be transmitted to the output side in the same time, with the same core volume as when a biased coil is employed. However, when this magnetically unbiased coil is employed, switching means Sw has to cut off a current of 40 A eight times in order to obtain the same rate of energy transmission per unit time.

Thus it can be seen that, by biasing the core of the coil, the benefit is obtained that the capacity of the switching means can be reduced to ¾ and its switching frequency can be reduced to ⅛.

In the above, for simplicity, the description of many of the structural elements has been idealized or simplified, but even in an actual application circuit, in a DC—DC converter circuit wherein the core of the coil is thus biased magnetically in the opposite direction to the direction of magnetization produced by the current supplied from the power source, and energy is accumulated thereon, it is found that, for the same core volume, increasing the amount of this bias makes it possible to lower the switching frequency of the switching means and to lower the capacity of the switching means itself.

The overall benefits that can be achieved are therefore: reduction of the current passed through the switching means and reduction of the energy loss resulting from switching, and, because of these, increased efficiency, simplification of the heat dissipation structure, increased life of the switching means and very considerable reduction in the overall size of the device.

Also, if a deep reverse bias of the coil core is employed, as shown in FIG. 7(b), that part of the current flowing in this coil that is below IL(MIN) shows a very rapid decrease/increase, so it can easily be absorbed by a filter capacitor provided at the power source input unit of the circuit; thus, the power source current ripple that is inevitably generated in a flyback-type converter can be reduced in the DC—DC converter circuit of the present invention.

Figure 9:
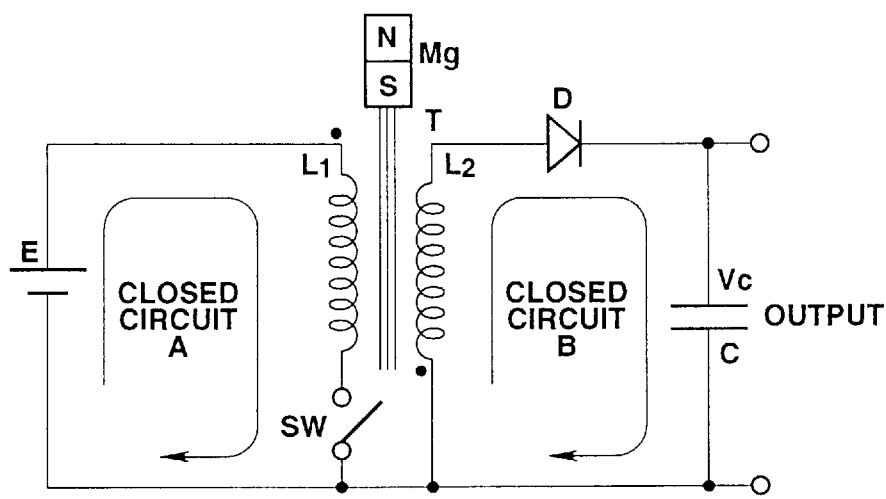
FIG. 9 is a circuit diagram showing another embodiment of a DC—DC converter circuit according to the present invention.

The circuit of a second embodiment of a DC—DC converter circuit according to the present invention is shown in FIG. 9.

The basic principle of this embodiment is the same as the first embodiment, but a multi-winding transformer T is employed instead of the single coil of the first embodiment. In this transformer T also, bias is applied in the opposite direction to the direction of the magnetic flux generated by the passage of the current, using for this purpose a permanent magnet Mg, in order to raise the energy density per unit area of the core. In this way, a small-size light-weight charger unit can be implemented, since a smaller transformer can be employed to implement a charger of equivalent performance.

The operation of this circuit will now be described with reference to FIG. 9.

Closed circuit A is formed by closing switch Sw. The energy supplied from the power source is accumulated on primary coil L1 of multi-winding transformer T. When switch Sw is opened, the energy accumulated in primary coil L1 shifts to secondary coil L2, with the result that a current flows in closed circuit B and capacitor C is charged up. More energy can be accumulated on capacitor C by repeating this opening/closure operation of switch Sw.

The circuit of this embodiment has the following further advantages.

1) The impedance can be changed on the primary side and secondary side.

Figure 10A:
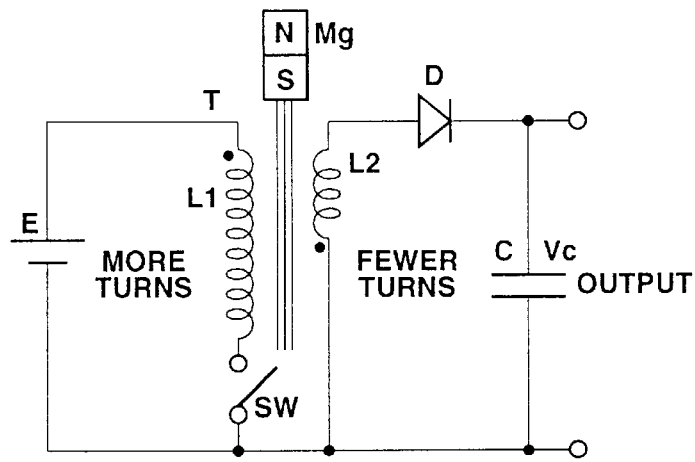
FIGS. 10(a), 10(b) and 10(c) are circuit diagrams showing a modification of the embodiment shown in FIG. 9 of a DC—DC converter circuit according to the present invention.

That is, by employing a larger number of windings on the primary side of transformer T, as in FIG. 10(a), and a smaller number of windings on the secondary side, the impedance on the secondary side can be made lower. The capacitor C provided on the secondary side can thereby be charged up with low voltage.

Figure 10B:
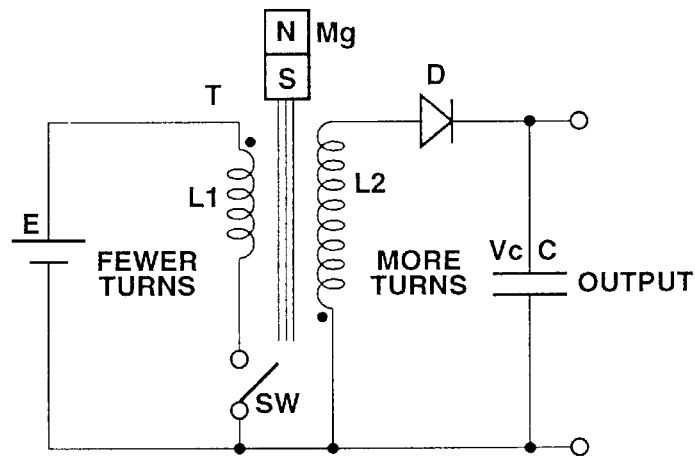

Also, if, as shown in FIG. 10(b), the number of windings on the primary side is made fewer while the number of windings on the secondary side is made larger, the impedance on the secondary side can be made higher. Capacitor C provided on the secondary side can thereby be charged up with high voltage. Also, in this case, if the charging voltage of capacitor C is taken as being Vc and the windings ratio of the transformer is r=n2/n1 (where n1 and n2 are respectively the number of windings of primary coil L1 and secondary coil L2), the withstand voltage of switch Sw can be made lower in the ratio Vc/r.

2) Electrical isolation can be achieved between the primary and secondary side.

Figure 10C:
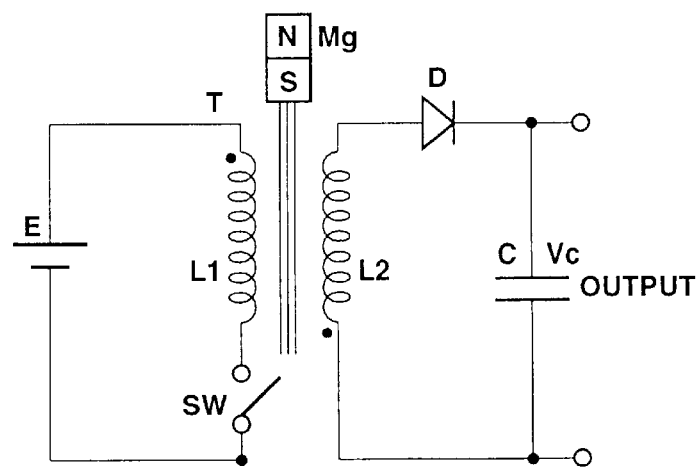

That is, electrical isolation can be achieved since the earths of the primary side and secondary side can be separated as shown in FIG. 10(c).

Figure 11:
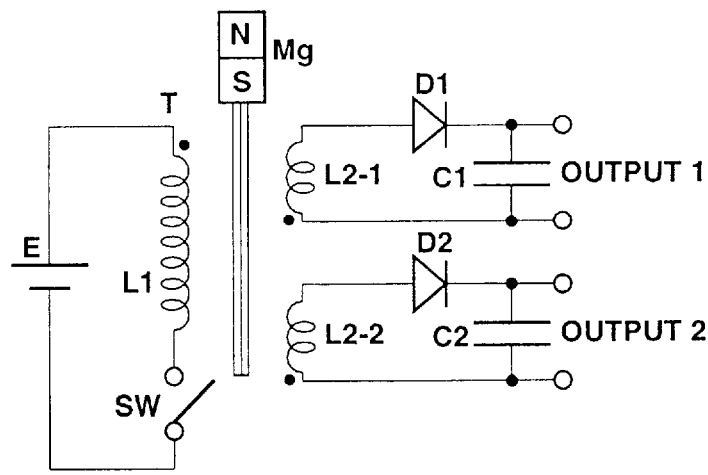
FIG. 11 is a circuit diagram showing another modification of the embodiment shown in FIG. 9 of a DC—DC converter circuit according to the present invention.

Yet a further embodiment using a transformer is shown in FIG. 11.

This embodiment is a DC—DC converter circuit wherein there are provided a first winding L1 connected to the power source and two secondary windings L2-1 and L2-2 sharing a core with this first winding L1. Secondary windings L2-1 and L2-2 are respectively provided with energy accumulation capacitors C1, C2 for output and rectifying means D1, D2 to prevent reverse current.

After first accumulating energy in the magnetically biased core by passing current to winding L1 by closing switching means Sw, when switching means Sw is opened, respective electromotive forces are created in secondary windings L2-1 and L2-2 by the energy accumulated in the core.

The number of windings of secondary windings L2-1 and L2-2 and the electromotive forces generated therein are proportional; if the two terminal voltages of output capacitors C1 and C2 are lower than the electromotive forces of these secondary windings L2-1 and L2-2, current flows to the circuit having the lower output capacitor. By this means, using a plurality of secondary windings, by setting the ratio of the number of windings of these, a plurality of power sources of different voltage can be obtained simultaneously. Furthermore, of the plurality of output circuits, the energy supplied from the power source is concentrated on the circuit where energy is discharged to load, so that the output voltage balance is automatically maintained.

Figure 12A:
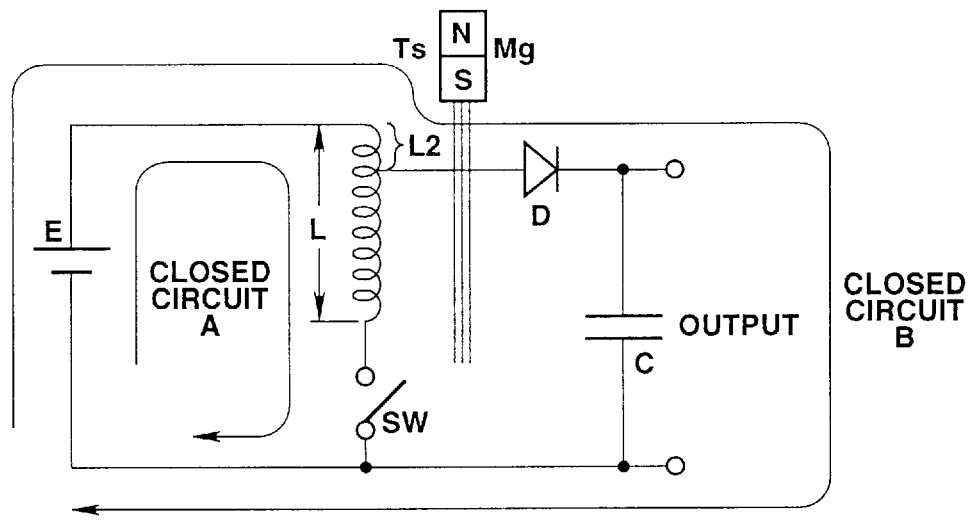
FIGS. 12(a) and 12(b) are circuit diagrams showing yet another embodiment of a DC—DC converter circuit according to the present invention.
Figure 12B:
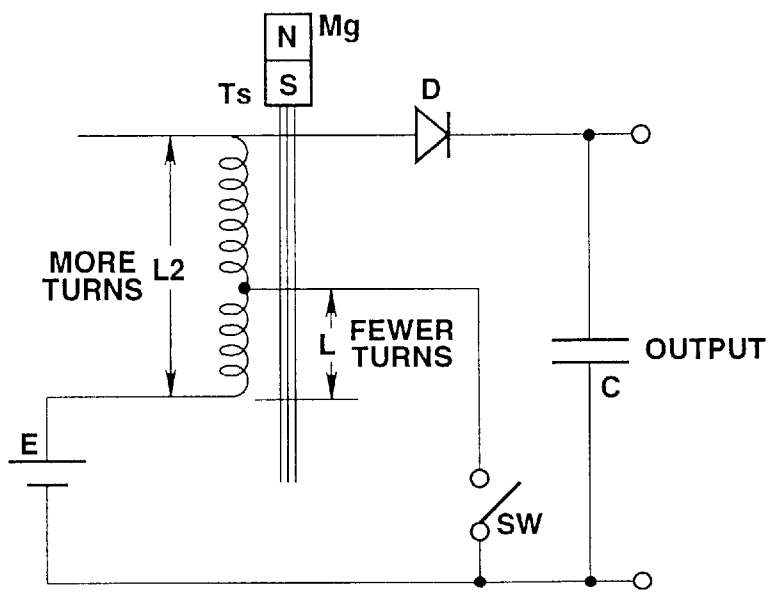

FIG. 12 shows the circuit of another embodiment of a DC—DC converter circuit according to the present invention.

The basic principles of this embodiment are the same as those of the first and second embodiments, but a single-winding transformer Ts is employed instead of the single coil of the first embodiment. In this transformer Ts, bias in the reverse direction to the direction of the magnetic flux generated by the passage of current is applied by a permanent magnet Mg, in order to raise the energy density per unit area of the core. In this way, a smaller transformer can be employed to implement a charger of equivalent capacity, so a charger unit of smaller size and lighter weight can be achieved.

The operation of this circuit is described below with reference to FIG. 12.

Closed circuit A is formed by closing switch Sw. The energy supplied from power source E is accumulated in coil L of single-winding transformer Ts. When switch Sw is opened, closed circuit B is constituted, and the energy stored in core L shifts to portion L2 of the coil, so that current flows in closed circuit B, charging capacitor C. Repetition of this opening/closing action of switch Sw enables more energy to be accumulated on capacitor C.

Also, with this circuit, as shown in FIG. 12, just as in the case of the circuit of the second embodiment, there is the advantage that the impedance on the primary side and the secondary side can be varied.

Figure 13:
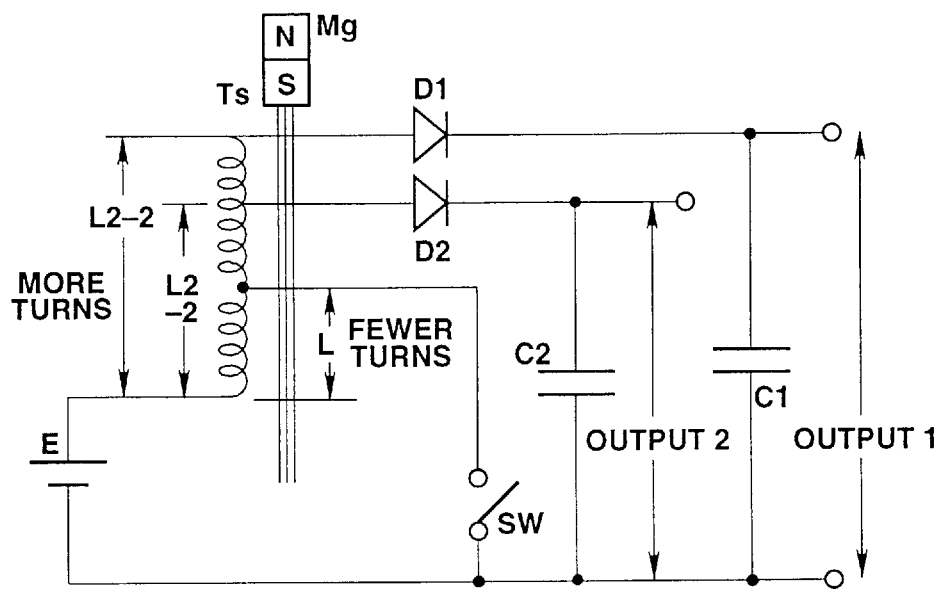
FIG. 13 is a circuit diagram showing a modification of the embodiment shown in FIG. 12 of the DC—DC converter circuit according to the present invention.

FIG. 13 shows yet a further embodiment of a DC—DC converter circuit according to the present invention, using a single-winding transformer.

In this embodiment, using a portion of winding L of single-winding transformer Ts, a closed circuit is formed by the power source and switching means Sw, as a result of which energy is accumulated on the magnetic core of magnetically biased transformer Ts; switching means Sw is then opened, and the accumulated energy is accumulated on energy accumulating capacitors C1, C2 by rectifying means D1, D2 for reverse current prevention, that are connected at a plurality of locations of winding L of single-winding transformer Ts, prior to being output.

In this example, just as in the case of the DC—DC converter circuit using a transformer in which a plurality of secondary windings were provided as described above, a plurality of outputs of different voltage can be output simultaneously.

Figure 14A:
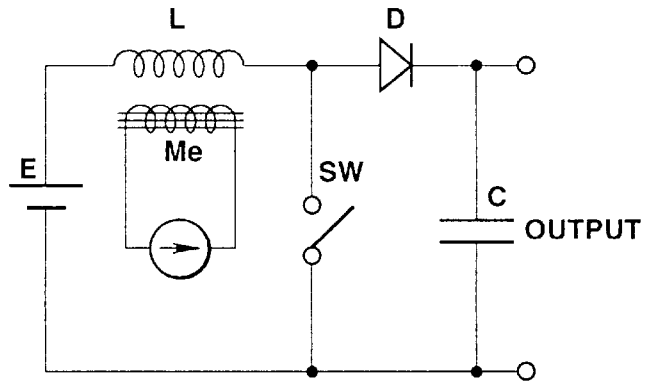
FIGS. 14(a), 14(b) and 14(c) are circuit diagrams showing yet another embodiment of the DC—DC converter circuit according to the present invention.
Figure 14B:
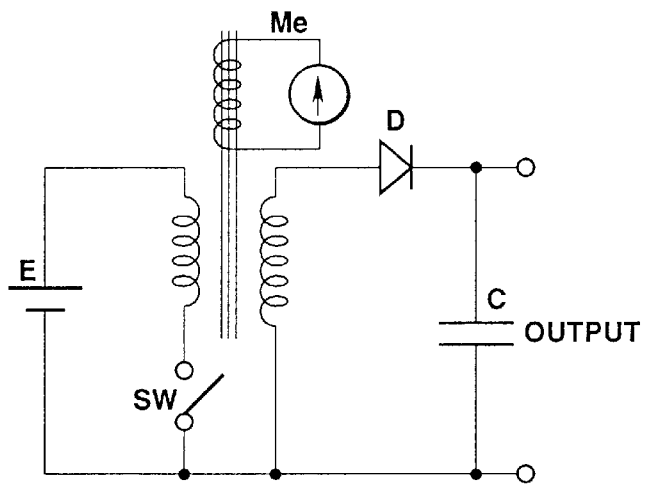
Figure 14C:
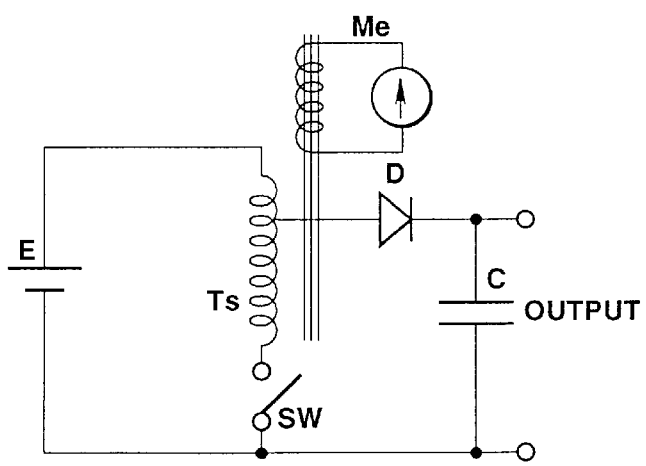

In the embodiments described above, a permanent magnet Mg was employed as the method of applying bias. Obviously the same effect could be obtained by using an electromagnet Me instead of this. Such an example is shown in FIG. 14. FIG. 14(a) is an example using a single coil; FIG. 14(b) is an example using a multi-winding transformer; and FIG. 14(c) is an example using a single-winding transformer.

Yet a further embodiment of the DC—DC converter circuit of the present invention is shown in FIG. 16.

By using a magnetic bias, as described above, the frequency of opening/closing of the switching means can be greatly decreased, for the same core volume, compared with the conventional circuit using a coil in which magnetic biasing is not employed; however, for a DC—DC converter circuit, the reduction in loss of the switching means during switching is also important.

Figure 15A:
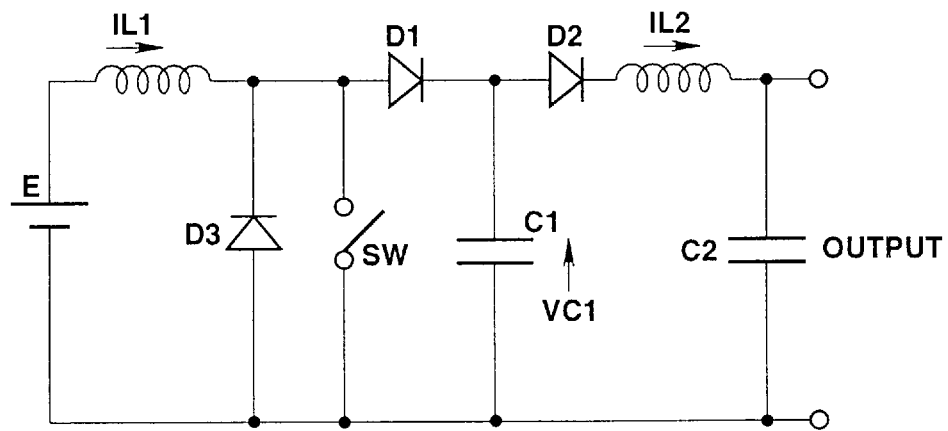
FIGS. 15(a) and 15(b) are diagrams showing a prior art example of a current resonance type DC—DC converter circuit.

FIG. 15(a) shows a prior art example of a DC—DC converter circuit answering this objective. An energy accumulating coil L1 is connected to a power source E and this is close-circuited by switching means Sw, supplying current to coil L1, with the result that energy is accumulated in the core of coil L1. Switching means Sw is then opened, with a timing that may be selected arbitrarily. The energy accumulated on coil L1 thereby charges capacitor C1 through rectifying means D1. When this switching means Sw is opened, charge is not accumulated on capacitor C1, so, even when switching means Sw is opened, voltage is not generated at the contacts of switching means Sw. The switching loss of switching means Sw is therefore greatly reduced.

The terminal voltage of capacitor C1 subsequently rises with charging from coil L1 until the terminal voltage of capacitor C2 is exceeded. When this happens, current charging up capacitor C2 flows through the series circuit consisting of capacitor C1, rectifying means D2 and second coil L2.

Soon, coil L1 completes the discharge of this accumulated energy, and the current supplied to capacitor C1 through rectifying means D1 is decreased. However, the circuit is designed such that the decrease of current flowing through coil L2 occurs later than this, so that the charge of capacitor C1 is gradually absorbed on the output side by the self-inductive effect of coil L2, with the result that capacitor C1 loses its accumulated charge.

Rectifying means D3 is provided if required, so that, when the charge accumulated by capacitor C1 is lost, current IL2 is bypassed and back-voltage is prevented from being applied to switching means Sw.

Such a circuit is operated as a series resonance circuit of capacitor C1 and coil L2, so it is usually called a current resonance circuit. The resonance period of the resonance circuit consisting of capacitor C2 and coil L2 must be set such that the charge of capacitor C1 becomes zero after the current supplied from coil L1 has disappeared.

Figure 15B:
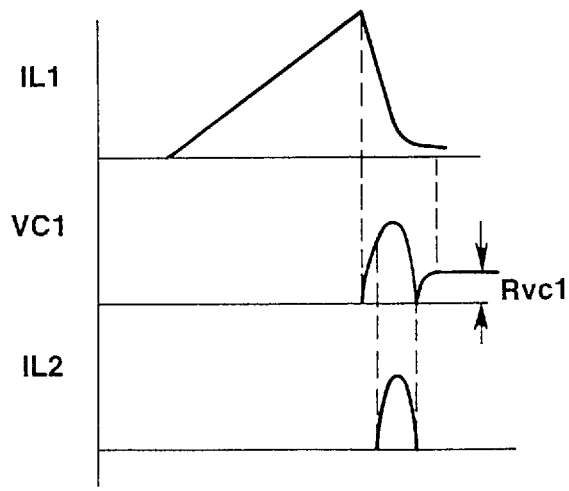

FIG. 15(b) shows the current waveform at various locations when this setting is insufficient. Specifically, even if the resonance current IL2 produced by coil L2 and capacitor C1 is zero, if IL1 is still present, the voltage between the two terminals of capacitor C1 may again rise, resulting in a residual voltage Rvc1. If this Rvc1 is higher than the voltage of capacitor C2, a current IL2 is again generated. However, if Rvc1 does not reach the level of the voltage of capacitor C2, this voltage is left unmodified at the two terminals of capacitor C1, and is a factor causing switching loss when switching means Sw is again cut off in the next cycle.

Figure 16A:
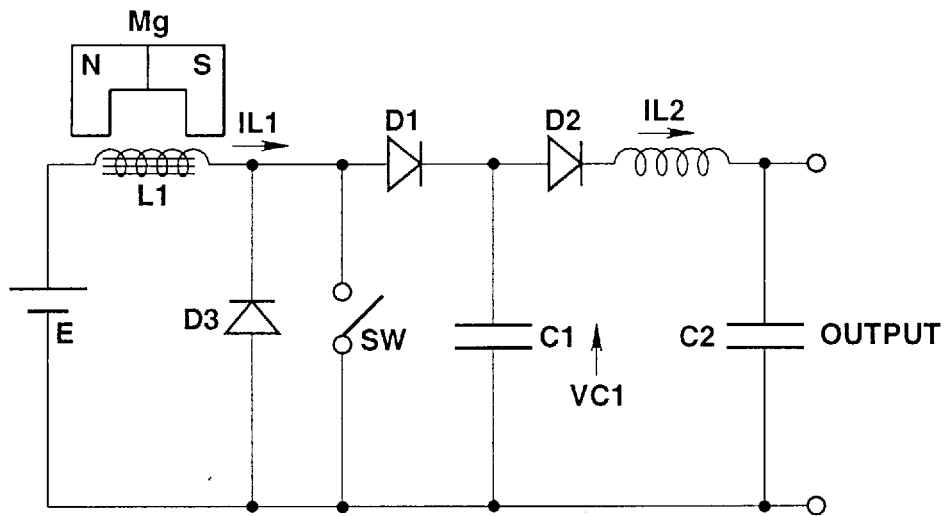
FIGS. 16(a) and 16(b) are diagrams showing yet another embodiment of the DC—DC converter circuit according to the present invention.
Figure 16B:
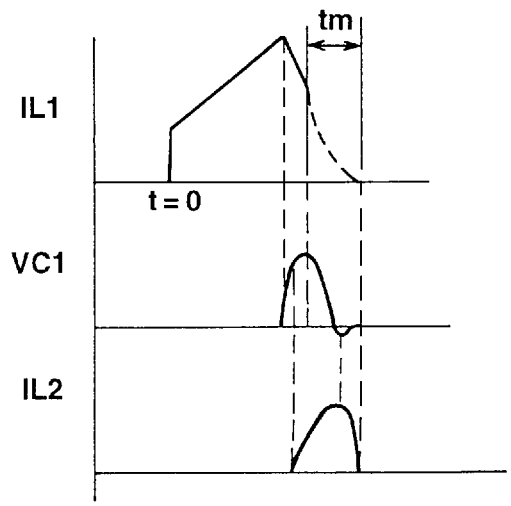

FIG. 16(a) shows an example of a DC—DC converter circuit of the current resonance type circuit configuration, when magnetic bias is applied to coil Li in accordance with the present invention, and FIG. 16(b) shows the current waveform that is then obtained.

In this case, by making the magnetic bias of energy accumulating coil L1 sufficiently deep, the current that is supplied from coil L1 to capacitor C1 can be made to change rapidly to 0A from a value that is amply sufficient. By this means, the current of coil L1 can be brought to 0 while there is still a sufficiently large current in coil L2, so a time margin tm is produced as shown in FIG. 16(b) and the benefit of suppression of the production of Rvc1 is obtained. Of course, the other benefits of the present invention such as reduction of capacity of the switching means, reduction of input current ripple, reduction of switching frequency and reduction in size of the coil are still obtained.

Figure 17A:
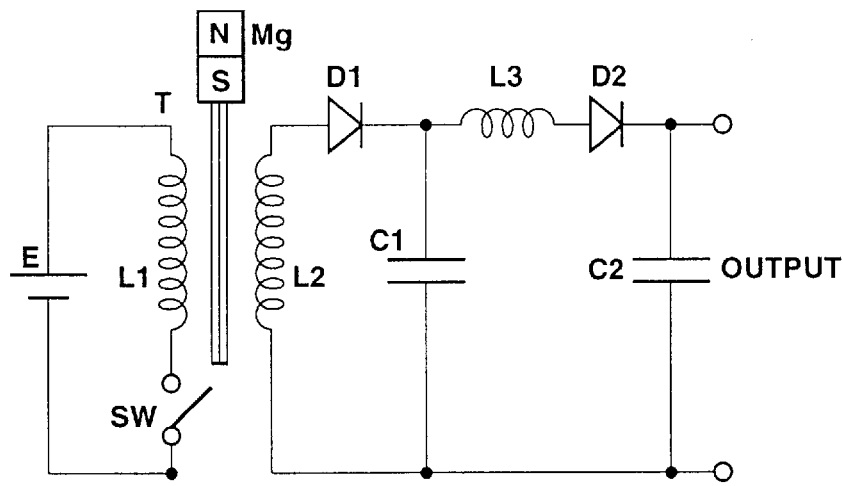
FIGS. 17(a) and 17(b) are circuit diagrams showing yet another embodiment of the DC—DC converter circuit according to the present invention.
Figure 17B:
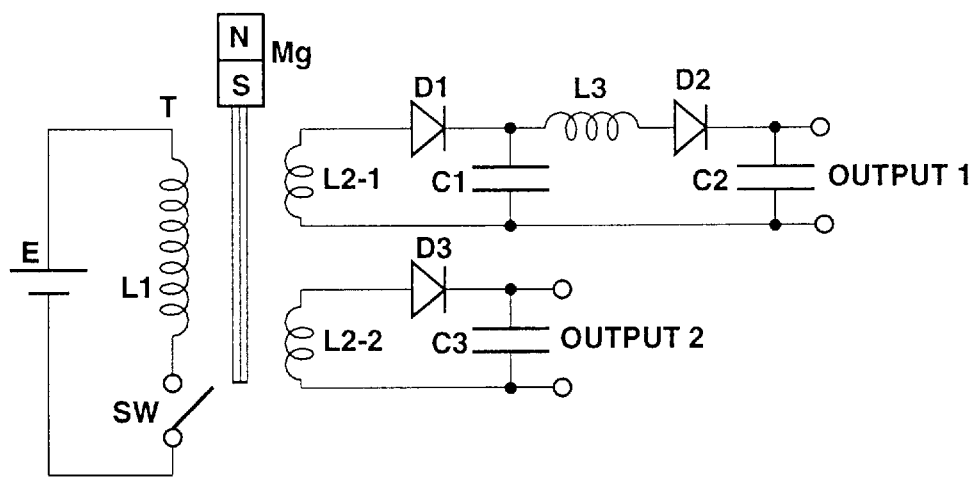

FIG. 17(a) is a circuit diagram of a current resonance type DC—DC converter according to the present invention constituted by a transformer having primary and secondary windings sharing a core. Its basic operation is the same as in the case of the single coil described above. However, if, as shown in FIG. 17(b), it is sought to obtain a plurality of voltages by using a plurality of secondary windings, a resonance circuit for reducing switching loss of switching means Sw may be provided in any one of the plurality of secondary windings. A design condition is that the charge of capacitor C1 that is provided for resonance must be eliminated when switching means Sw is open. Also, it is necessary to take care that the other outputs that are concurrently provided have the values obtained by converting the maximum charging voltage of capacitor C1 using the turns ratios of the respective secondary windings.

Figure 18:
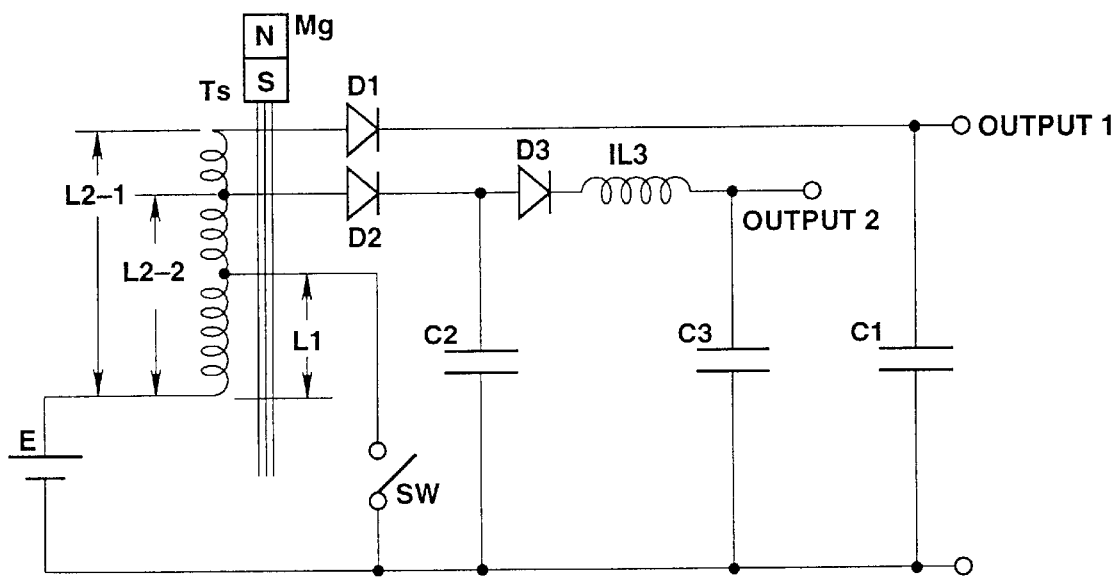
FIG. 18 is a circuit diagram showing yet another embodiment of the DC—DC converter circuit according to the present invention.

FIG. 18 is a circuit diagram of a current resonance type DC—DC converter according to the present invention constructed using a single-winding transformer. The DC—DC converter action and resonance operation are the same as already described with reference to a multi-winding transformer.

Figure 19:
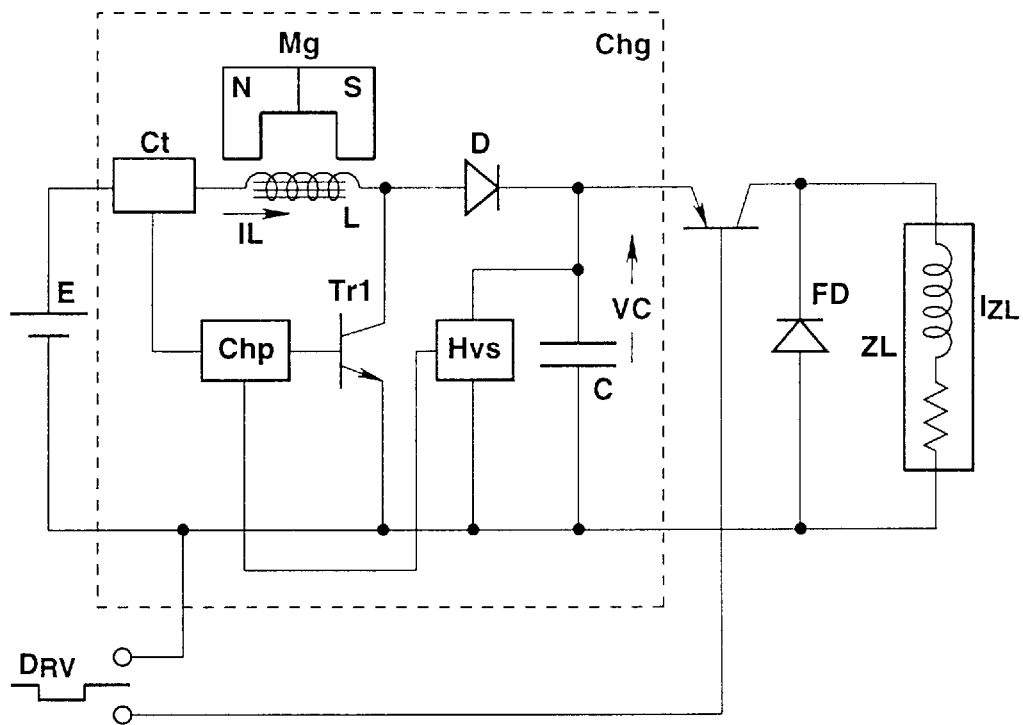
FIG. 19 is a circuit diagram of an embodiment of an inductive load driver using the DC—DC converter circuit according to the present invention.

FIG. 19 shows an example of an inductive load drive device using a DC—DC converter circuit according to the present invention as described above.

In this circuit, the portion enclosed by dotted lines and indicated by Chg is the DC—DC converter circuit of the present invention. This DC—DC converter circuit Chg comprises means for detecting current Ct connected to the power source E, an energy accumulating coil L whose core is magnetically biased, a first switching means Tr1 that opens and closes a circuit containing power source E, means for detecting current Ct and energy accumulation coil L, rectifying means D whose anode is connected to the point of connection of this first switching means Tr1 and energy accumulating coil L, an output energy accumulation capacitor C that is connected to the cathode of rectifying means D and to the other terminal of first switching means Tr1, means for voltage detection Hvs that detects the charging voltage of this output energy accumulating capacitor C, and means for generating a chopping signal Chp that inputs the output of means for detecting current Ct and means for voltage detection Hvs and generates a signal that switches first switching means Tr1 on and off.

This inductive load drive device inputs a drive signal Drv specifying the drive of the inductive load; it is connected in parallel with load Zl and second switching means Tr2 that applies to inductive load Zl the output of the DC—DC converter and is switched by this drive signal Drv; there is provided a flywheel-current rectifying means (flywheel diode) FD that passes the flywheel current generated by self-inductance of this load ZL when the current of inductive load ZL is cut off or reduced.

Figure 20:
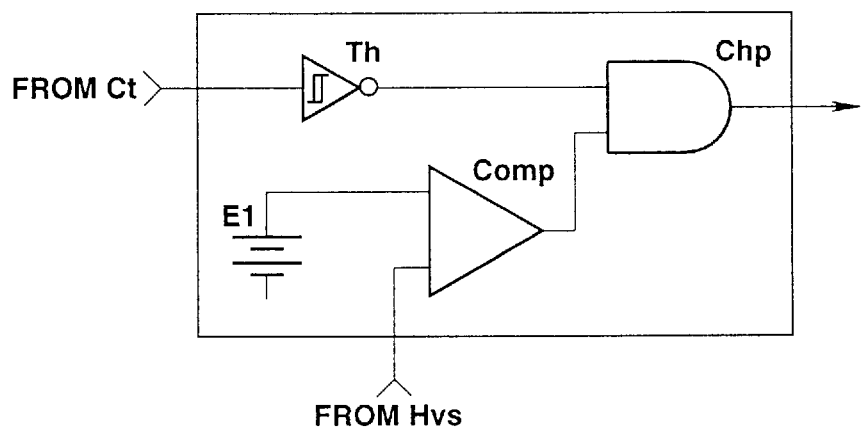
FIG. 20 is a configuration diagram of a means for generating a chopping signal used in the inductive load drive device shown in FIG. 19.

FIG. 20 shows the configuration of means for generating a chopping signal Chp.

Means for generating a chopping signal Chp comprises internal reference voltage E1, comparator Comp, means for inverting Th having a hysteresis characteristic that inputs the signal of means for detecting current Ct, and an AND circuit that supplies to a first switching means Tr1 the logical product obtained by inputting the output of comparator Comp and the output of means for inverting Th.

Figure 21:
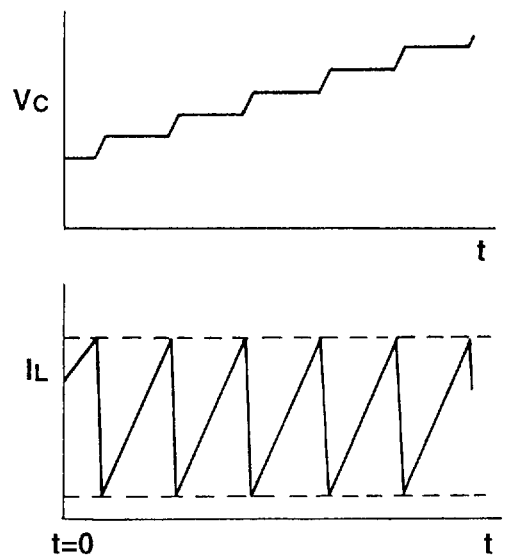
FIG. 21 is a waveform diagram of various parts of the inductive load driver shown in FIG. 19.

Next, the operation of this DC—DC converter and the various waveforms shown in FIG. 21 and FIG. 22 will be described.

It is assumed that the output of comparator Comp is normally "1" (actuated condition).

At t=0, first switching means Tr1 is closed, and coil current I1 is in the course of rising. Eventually, coil current I1 reaches a threshold value on the cut-off side of means for inverting Th having a hysteresis characteristic. This cut-off side threshold value is set to the current obtaining when sufficient energy has been accumulated on energy accumulating coil L.

When the coil current I1 exceeds this threshold value, the output of means for inverting Th is cut off, and, concurrently, first switching means Tr1 is also cut off (open-circuited). By this means, the current I1 of energy accumulating coil L charges the output energy accumulating capacitor C through rectifying means D. Current I1 of energy accumulating coil L is decreased by the discharge of energy to capacitor C until it reaches the power-on side threshold value of means for inverting Th; when this happens, first switching means Tr1 is again closed. By repetition of these operations, the voltage Vc between the two terminals of output energy accumulating capacitor C progressively increases.

The voltage Vc across the two terminals of capacitor C is subjected to voltage division so as to enable subsequent processing, if necessary, by means for voltage detection Hvs, or, if this is not necessary, is directly supplied to be compared with reference voltage E1 within means for generating a chopping signal Chp. If the voltage Vc across both terminals of capacitor C, or the value obtained by subjecting this to voltage division, exceeds reference voltage E1, the output of comparator Comp is cut off, and first switching means Tr1 also holds its cut-off (open) condition.

Figure 22:
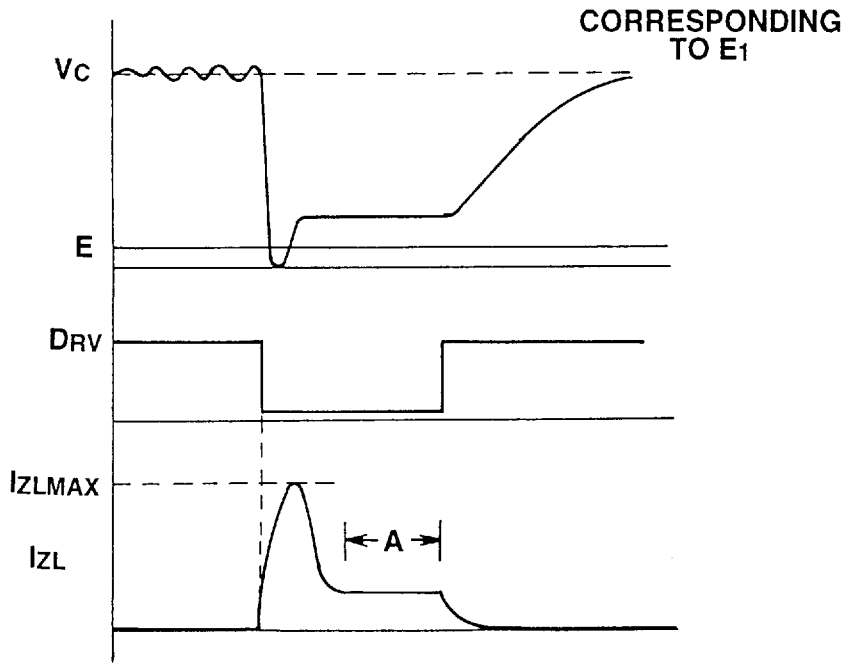
FIG. 22 is a waveform diagram of the various parts of an inductive load driver shown in FIG. 19.

As shown in FIG. 22, the voltage Vc across both terminals of capacitor C corresponding to reference voltage E1 exceeds power source voltage E of the circuit, so this voltage is held by reverse-flow prevention rectifying means D.

When, in this condition, load drive signal Drv is input, second switching means Tr2 is closed, and the voltage Vc across both terminals of output energy accumulating capacitor C is applied to inductive load ZL. Load current Iz1 abruptly rises due to the voltage Vc exceeding the power source voltage E accumulated on this capacitor C. The speed of current rise and maximum current value at this point are determined by the impedance of load ZL, the capacitance of capacitor C and the voltage Vc across both its terminals; the circuit constants and the magnitude of the reference voltage E1 in the means for generating a chopping signal Chp, and the voltage division ratio in means for voltage detection Hvs are set such that the desired load current is obtained.

When capacitor C discharges this accumulated energy to load ZL, the voltage Vc across its terminals decreases. This process is monitored as the behavior of the resonance circuit of capacitor C and the inductance component of load ZL; eventually the charge of capacitor C disappears and the voltage Vc across its two terminals becomes 0V. The load current Iz1 is maintained by the self-inductance effect of load ZL, but, since, in this process, the flywheel current rectifying means FD conducts, the load current Iz1 freewheels through the freewheel path constituted by load ZL and flywheel current rectifying means FD, being gradually reduced by dispersion of its energy in the form of heat by the resistive component of load ZL.

On the other hand, as a result of the decrease of voltage Vc across both terminals of capacitor C, the output of comparator Comp in means for generating a chopping signal Chp is activated, and, as a result, the process is repeated in which first switching means Tr1 is again closed, passage of current in energy accumulation coil L is commenced, coil passage current IL is increased, and first switching means Tr1 is thereby open-circuited by the action of means for inverting Th having a hysteresis characteristic, followed by discharge of the energy accumulated on the coil to capacitor C. However, at this time point, second switching means Tr2 is closed, so the energy discharged from the coil is temporarily accumulated in capacitor C, then averaged and supplied to load ZL.

By this series of operations, a fixed current matching the energy supplied from the coil is supplied to load ZL. When this process is observed from the time point where the free-wheeling of the load current Iz1 after its initial rapid rise has been completed, it corresponds to zone A in FIG. 22.

Next, when load drive signal Drv terminates after the passage of the desired load drive time, allowing the second switching means to open, the load current Iz1 decreases to 0A whilst freewheeling through flywheel-current rectifying means FD. In this way, a voltage exceeding the power source voltage E is again accumulated on output energy accumulation capacitor C.

In this way, by using this circuit, by introducing a large amount of energy into an inductive load ZL such as for example an electromagnetic valve in the initial period of its operation, opening of the valve can be advanced, and the value of the load current Iz1 can be reduced to the value at which the open condition of the electromagnetic valve is maintained: in this way, evolution of heat from the load ZL can be kept at a low level. Also, by employing a DC—DC converter wherein the core of the energy accumulation coil according to the present invention is magnetically biased as the DC—DC converter circuit used in this circuit, production advantages such as miniaturization of the device, improved efficiency, and lower manufacturing costs can be obtained.

Figure 23:
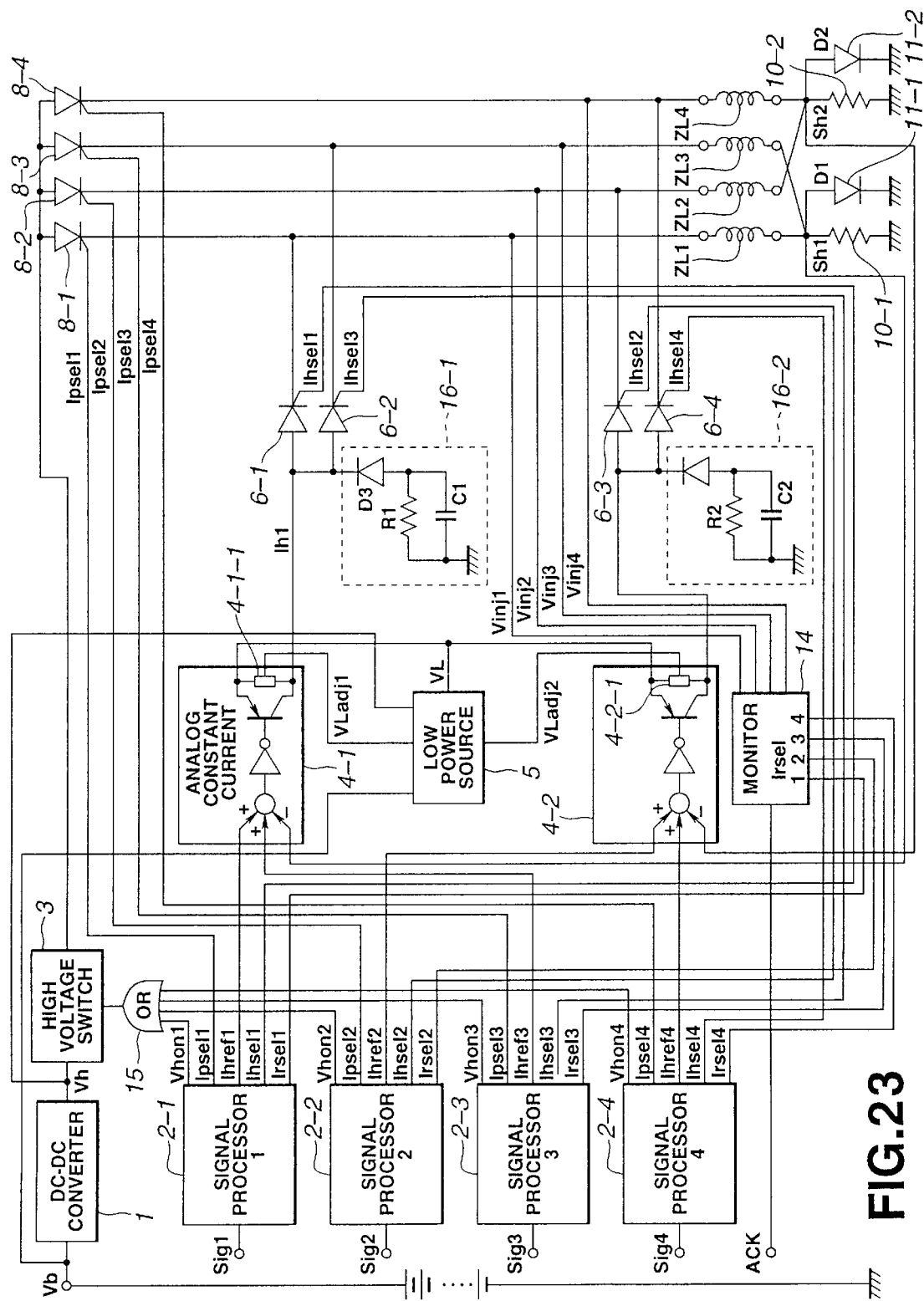
FIG. 23 is a circuit diagram of another embodiment of the inductive load driver using the DC—DC converter circuit according to the present invention.

FIG. 23 shows a further embodiment of an inductive load drive device according to the present invention.

This device is constructed so as to be capable of driving four inductive loads ZL1 to ZL4. The device comprises a DC—DC converter circuit 1 having a power source Vb and an energy accumulating coil that is connected to power source Vb and whose core is magnetically biased, for generating a voltage higher power source Vb; high voltage switching means 3 that switch the output of this DC—DC converter circuit 1 on or off; an OR circuit 15 capable of driving high voltage switching means 3 in response to one or other of one or more high voltage switch drive signals that are input; one or more high voltage distributive switching means 8-1 to 8-4 for connection of the output of high voltage switching means 3 to one or more inductive loads ZL1 to ZL4; a low voltage power source circuit 5 connected to power source Vp and having a variable output voltage of less than the power source voltage; one or more analogue constant-current output circuits 4-1, 4-2 connected to this low voltage power source circuit 5 and that inputs a holding current signal and a load current feedback signal from load current detecting means 10-1, 10-2, and that controls load current to a value matching the hold current; low voltage power source regulating circuits 4-1-1, 4-2-1 that input the voltage drops of the output means of these analogue constant-current output circuits 4-1, 4-2 and that, when the voltage drops exceed prescribed values generate signals to lower the output voltage of low voltage power source circuit 5; at least one surge absorption snubber circuits 16-1, 16-2 that absorb the self-induction energy of inductive loads ZL1 to ZL4 generated when the drive currents of the one or more inductive loads ZL1 to ZL4 are reduced; and signal processing circuits 2-1 to 2-4 for inputting at least one load drive signal and outputting a high voltage switch drive signal for driving high voltage switching means 3 for a prescribed fixed time from the time point signified by this load drive signal with respect to the various load drive signals, a drive signal of high voltage distributive switching means 8-1 to 8-3 for connection of the output of high voltage switching means 3 to loads ZL1 to ZL4 to be driven, which are determined by the load drive signal, and a prescribed holding current value signal to analogue constant-current output circuits 4-1, 4-2 during the period in which the input load drive signals are indicated as continuing load drive, and, simultaneously, for outputting drive signals of low voltage distributive switching means 6-1 to 6-4 for connecting the output of analogue constant-current output circuits 4-1, 4-2 to the load to be driven determined by the load drive signal, and for outputting a drive-completed signal when termination of the load ZL1 to ZL4 drive is indicated by the input load drive signal.

The operation of this circuit will now be described with reference to FIG. 23.

This drive circuit supplies current to inductive loads ZL1 to ZL4 in accordance with a drive signal Sig designating drive of inductive load ZL1 to ZL4; drive signal Sig is sent from an ECU (electronic control unit), not shown, as needed. Examples are: with the object of opening or closing a hydraulic electromagnetic valve for controlling the actuator of a hydraulic machine or the like, or with the object of opening or closing the valve of an electromagnetic injector supplying fuel to an engine, or with the object of opening or closing an electromagnetic valve that controls liquid pressure or gas pressure, or with the object of exciting/demagnetizing the drive phase of a stepping motor device.

In for example the case of a device where the load is for example an electromagnetic valve, the characteristic required for the control would be such that: high voltage is applied to the load in the initial period of drive commencement of the inductive load so as to advance the commencement of actuation of the load by rapidly increasing the load current, and, in the step in which the valve is held after the valve opening action has been completed, generation of heat by the load is suppressed by reducing the current value to the value necessary to hold the load current in the valve-open condition, and, when the load drive has been completed, that the residual energy of the load is rapidly eliminated, so that the valve can be rapidly closed.

Also, in the case where the load is a stepping motor device, for example, the characteristic demanded would be such that, at the commencement of excitation of the drive phase, a large amount of energy is rapidly introduced into the coil forming the phase so as to accelerate the movement of the rotor; when the rotor has reached a fixed position with respect to the pole, the current is decreased so that generation of heat in the coil can be suppressed, and, when excitation shifts from this phase to the next phase, the energy (excitation current) of this phase is rapidly decreased so as to suppress generation of force on the rotor opposing the force with which it is attracted to the next phase.

Figure 24:
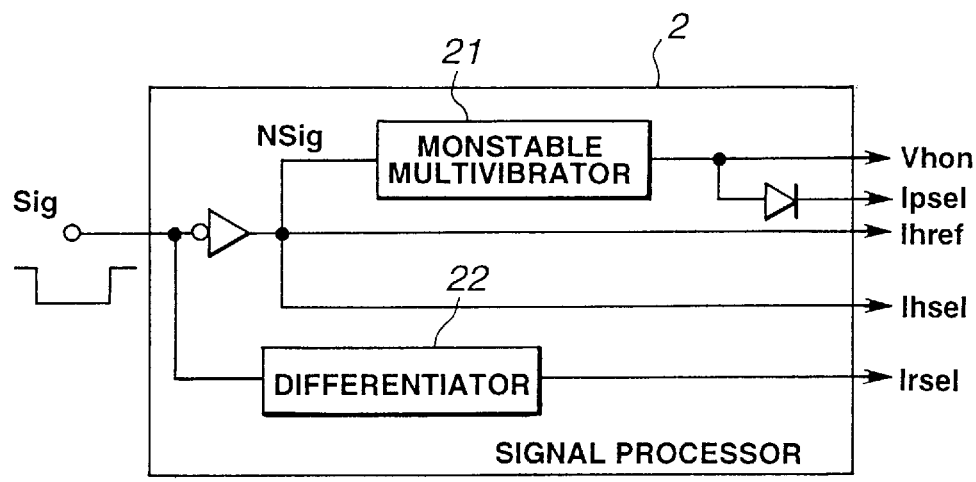
FIG. 24 is a configuration diagram of a signal processing circuit used in the inductive load driver shown in FIG. 23.
Figure 25:
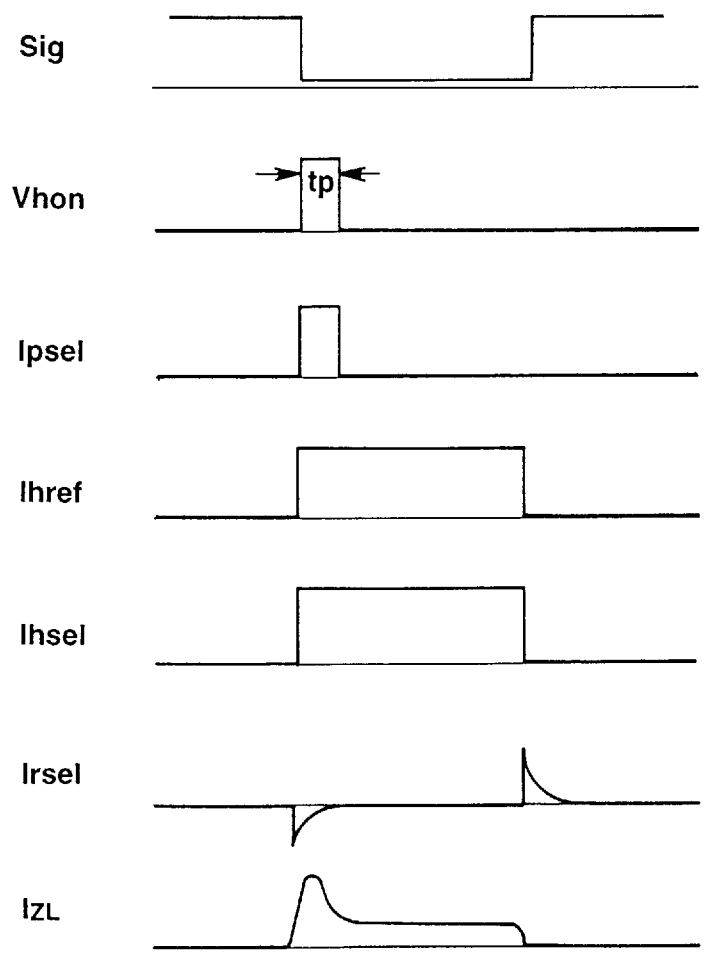
FIG. 25 is a waveform diagram of various parts of the signal processing circuit shown in FIG. 24.

Further details of the construction of signal processing circuit 2 are shown in FIG. 24 and the waveforms of the various parts of signal processing circuit 2 are shown in FIG. 25.

In FIG. 23, there are provided four of these signal processing circuits 2, corresponding to the number of loads ZL1 to ZL4.

Signal processing circuit 2 inputs a drive signal Sig; a monostable multivibrator 21 is actuated by this inverted drive signal NSig. Monostable multivibrator 21 is operated by the leading edge of inverted drive signal Nsig, to output a high voltage switch signal Vhon having a fixed period Tp, and a high voltage distribution switch drive signal Ipsel. If required, it could also output analogue voltage signal Ihref obtained by voltage division of inverted drive signal Nsig. Analogue voltage Ihref designates the holding current value in the steady drive condition of the load. Also, a logic signal corresponding to inverted drive signal Nsig itself is output as low voltage distribution switch drive signal Ihsvl. Furthermore, a signal obtained by differentiating drive signal Sig is also output as drive completion signal Irsel.

Figure 26:
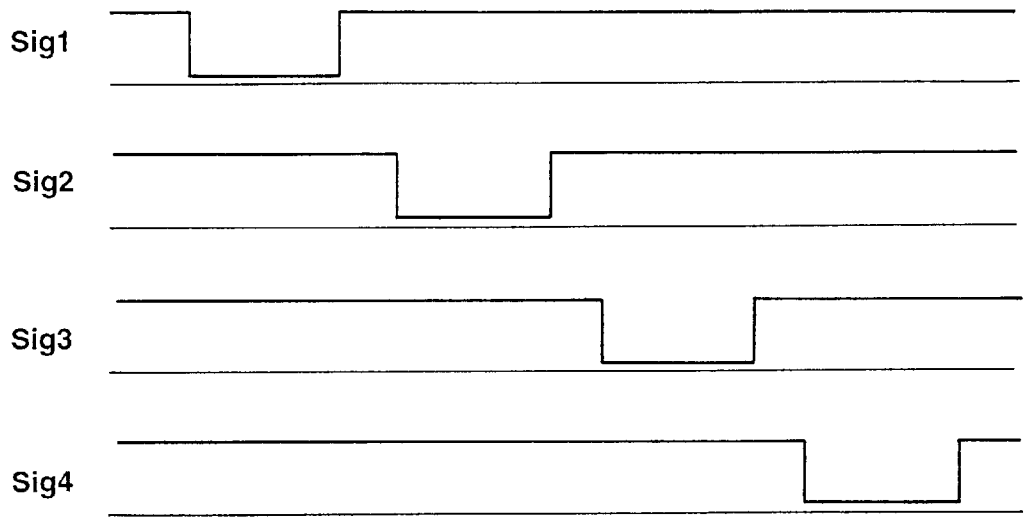
FIG. 26 is a waveform diagram of a drive signal that is input to the signal processing circuit shown in FIG. 25.
Figure 27:
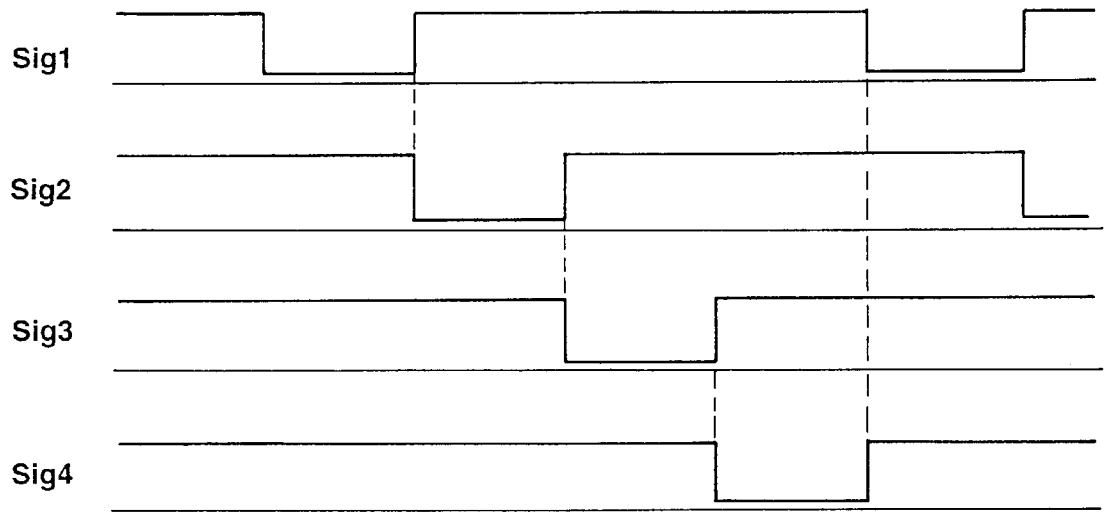
FIG. 27 is a waveform diagram of a drive signal that is input to the signal processing circuit shown in FIG. 25.
Figure 28:
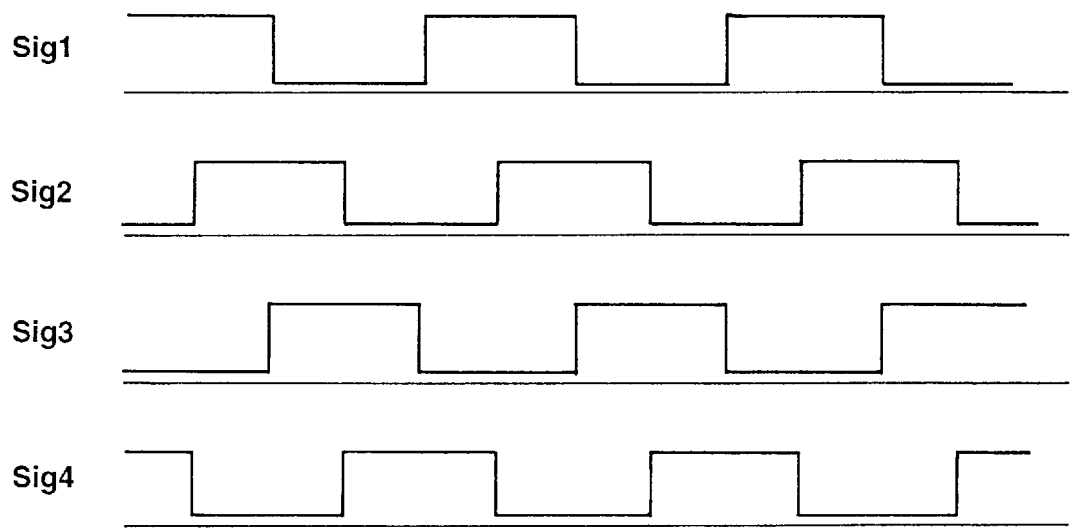
FIG. 28 is a waveform diagram of a drive signal that is input to the signal processing circuit shown in FIG. 25.

FIG. 26 to FIG. 28 show examples of drive signal that are input to this circuit. The drive signals are respectively independently and successively input from Sig1 to Sig4 in FIG. 26. This corresponds for example to the drive sequence of an injector device in which fuel is sequentially supplied to a four-cylinder engine device. Also, regarding the arrangement of the drive signals Sig1 to Sig4 in FIG. 28, this is such that the next signal is input simultaneously with the determination of the respective immediately previous signal. This corresponds for example to the excitation sequence of drive phases in a four-phase stepping motor device. Further, in FIG. 28, respective drive signals may be input overlapping by a half-period with the respective immediately preceding signal. In this case, Sig1 and Sig3 on the one hand and Sig2 and Sig4 on the other are respectively of inverse phase; for example output channels 1 and 3 on the one hand and 2 and 4 on the other respectively correspond to the operating sequences in the alternately opened/closed valves of a pair of electromagnetic valves for a double-shaft hydraulic circuit. This circuit has the benefit that it can be employed in a wide range of applications since it permits the mutual relationship of the respective input signals in this way, up to the half-period overlap of FIG. 28.

When power source Vb is supplied to the circuit in FIG. 23, the DC—DC converter circuit 1 for high voltage generation commences the charging of high voltage, exceeding the power source voltage, accumulation and discharge of energy with respect to this energy accumulation capacitor being repeated until this reaches the prescribed voltage.

Thereupon, when drive signal Sig1 is input, high voltage switch drive signal Vhonl described above is output from signal processing circuit 2-1 and high voltage switching means 3 is thereby closed. Simultaneously with this, the high voltage distribution signal drive signal Ipsel1 described above is output, and high voltage means for distribution 8-1 is also selectively closed. The high voltage obtained by DC—DC converter circuit 1 is thereby applied to inductive load ZL1 rapidly increasing the load current of inductive load ZL1. At this point, holding current value signal Ihref1 is simultaneously input to analogue constant-current circuit 4-2 from signal processing circuit 2-1, and low-voltage distribution switch drive signal Ihsel1 is also output. However, high voltage is not applied from the high voltage power source to the drive-side terminal of load ZL1 so the holding current cannot flow to the load side; also, a large load current resulting from the application of high voltage flows through means for detecting current 10-1, so the output of an addition circuit that is arranged in the input unit of analogue constant-current circuit 4-1 acts in the direction to cut off the output of analogue constant-current circuit 4-2, so that this output is not generated.

When a period Tp has elapsed, the high voltage switch drive signal and high voltage distribution switch drive signal disappear. DC—DC converter circuit 1 is thereby isolated from the load. At this point, the large load current referred to above is still present in the load, so, due to the self-inductance characteristic of the load, the load current tries to maintain this value. However, the output of analogue constant-current circuit 4-1 is cut off, so the current resulting from the inductance of the load is absorbed by the snubber circuit 16-1 through the selected low-voltage distributive switching means 6-1. The load current of inductive load ZL1 is decreased by the discharge of energy to snubber circuit 16-1, and the output of means for detecting current 10-1 is also thereby decreased. When the load current of inductive load ZL1 cuts in to a value matching the holding current value signal Ihref, analogue constant-current circuit 4-1 starts to supply current.

Figure 29:
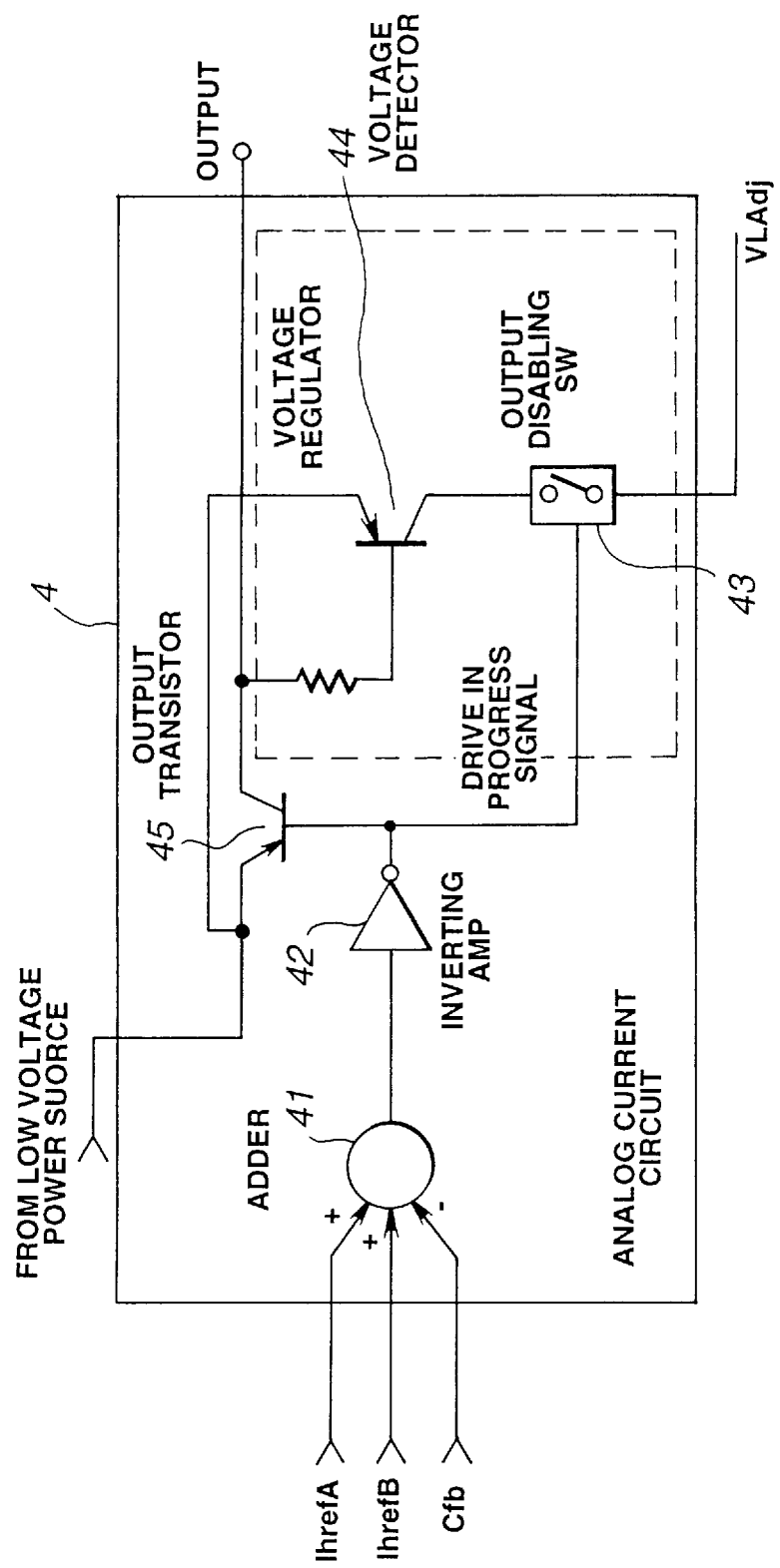
FIG. 29 is a configuration diagram of an analogue constant-current circuit used in an inductive load driver shown in FIG. 23.

The construction of analogue constant-current circuit 4 is shown in more detail in FIG. 29.

Analogue constant-current circuit 4 comprises an adder 41 that adds the holding current value signal and the output of means for detecting current 10 that detects the load current; an inverting amplifier 42 that amplifies the result of this addition; an output transistor 45 that outputs current to the load from low-voltage power source 5 under the control of the output of inverting amplifier 42; means for voltage detection 44 that detects when the voltage drop generated across the two terminals of this transistor 45 exceeds a prescribed value (in this case the prescribed value is the voltage between base and emitter of a bipolar transistor); and an output-disabling switch 43 that outputs the output of this means for voltage detection 44 to the outside only when output transistor 45 is driven.

Now, when output current matching the holding current value signal Ihref from the analogue output circuit is supplied to the load, means for voltage detection 44 is constantly monitoring the voltage drop generated at both terminals of output transistor 45; if for example the temperature of the load is low, causing its DC resistance to be small, the two-terminal voltage of the load becomes smaller than the output voltage of the low-voltage power source 5, with the result that the voltage drop of output transistor 45 becomes large; thereupon, when means for voltage detection 44 detects this, it outputs to low-voltage power source 5 a voltage adjustment signal Vladj causing it to lower its output voltage.

When low-voltage power source 5 receives this voltage adjustment signal Vladj, it gradually lowers its output voltage. If there is no voltage adjustment signal Vladj, power source 5 has the function of gradually increasing its output. Consequently, the analogue constant-current circuit 4 supplies a constant current to the load and, due to the action of means for voltage detection 44, control is effected such that the loss of the circuit is minimized.

When drive signal Sig terminates, the holding current value signal Ihref becomes 0 and the output of analogue constant-current circuit 4 is thereby cut off. Simultaneously, drive completion signal Irsel1 is output by signal processing circuit 2-1. Since the output of analogue constant-current circuit 4-1 is then cut off, the surge voltage generated by the inductance component of the load is absorbed by snubber circuit 16-1.

The operation of this circuit with respect to drive signal Sig1 was described above. However, in FIG. 26, respective drive signals Sig1 to Sig4 are input independently of other drive signals Sig1 to Sig4, and the respective circuits operate identically with respect to respective drive signals Sig1 to Sig4.

Next, the case where the respective drive signals are continuously input as in FIG. 27 will be described. As shown in FIG. 23, DC—DC converter circuit 1 and high voltage switching means 3 are common to four loads ZL1 to ZL4. However, closure of high-voltage switching means 3 and high-voltage distributive switching means 8-1 to 8-4 is restricted to the period tp of FIG. 25 after input of respective drive signals Sig1 to Sig4, and analogue constant-current circuits 4-1, 4-2 and snubber circuits 16-1, 16-2 are respectively common to loads ZL1, ZL3 and loads ZL2, ZL4. Consequently, the same operation is obtained as in the case where drive signals Sig1 to Sig4 are independent, there being no circuit interference between drive signals Sig1 and Sig2.

Also, even where there are mutually overlapping inputs as in FIG. 28, this circuit only performs operation as described above when the DC—DC converter circuit 1 has completed accumulation of the prescribed high voltage on its output capacitor by the respective drive commencement point at which high voltage is needed in the adjacent drive timing.

In the inductive load drive device described in the above embodiment, apart from the holding current of the load, in the initial drive period, a large current produced by application of high voltage flows in load current detecting means 10-1, 10-2 in the initial drive period. For example, if these load current detecting means 10-1, 10-2 are DC resistance means such as shunt resistors, this large current instantaneously generates a large amount of heat, which not only increases the generation of heat of the circuit as a whole but also impedes efficient utilization of the energy from DC—DC converter 1 which is intended to be applied to the load. With the object of ameliorating this, there are provided bypass means 11-1, 11-2 in parallel with means for detecting current 10-1, 10-2, which are non-conductive when the voltage across the terminals of these detection means is below a prescribed voltage, but which have a constant-voltage characteristic such that they conduct, maintaining the voltage between these two terminals, when a prescribed voltage is exceeded.

In this way, in the period of passage of the holding current, in which the value of the output voltage of means for detecting current 10-1, 10-2 is valid, bypass means 11-1, 11-2 are non-conducting, but, at the commencement of drive of inductive loads ZL1 to ZL4, whilst a large current is passing due to application of high voltage to the load, bypass means 11-1, 11-2 conduct, so that the voltage across the two terminals of means for detecting current 10-1, 10-2 is clamped at a prescribed voltage exceeding the output voltage produced by the holding current.

Consequently, whilst maintaining the function of cutting off the output of the analogue constant-current circuit 4, excess generation of heat energy by the means for detecting current can be prevented, thereby enabling the energy from the DC—DC converter 1 to be applied to the load more effectively.

Figure 30:
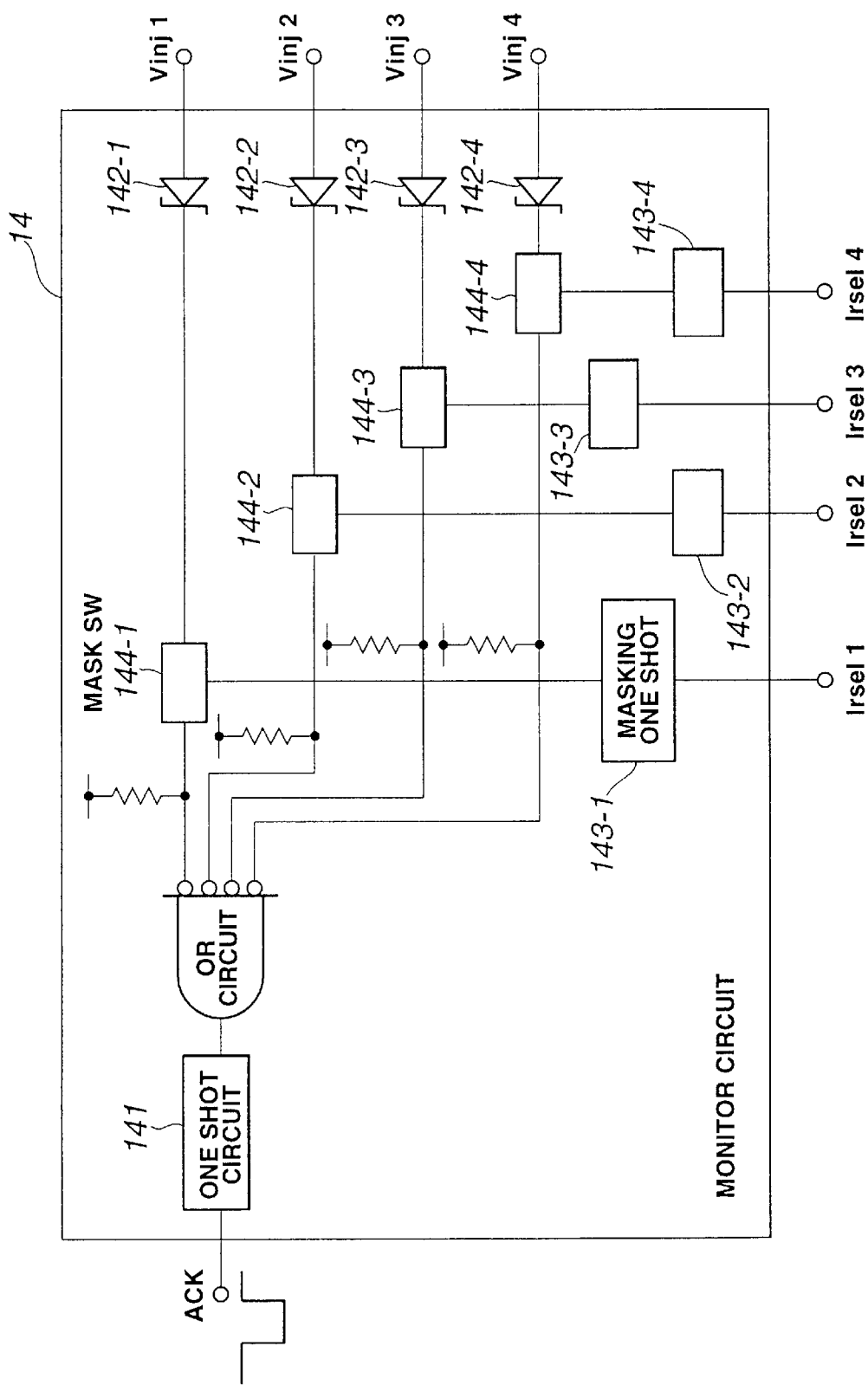
FIG. 30 is a configuration diagram of a monitor circuit used in the inductive load driver shown in FIG. 23.
Figure 31:
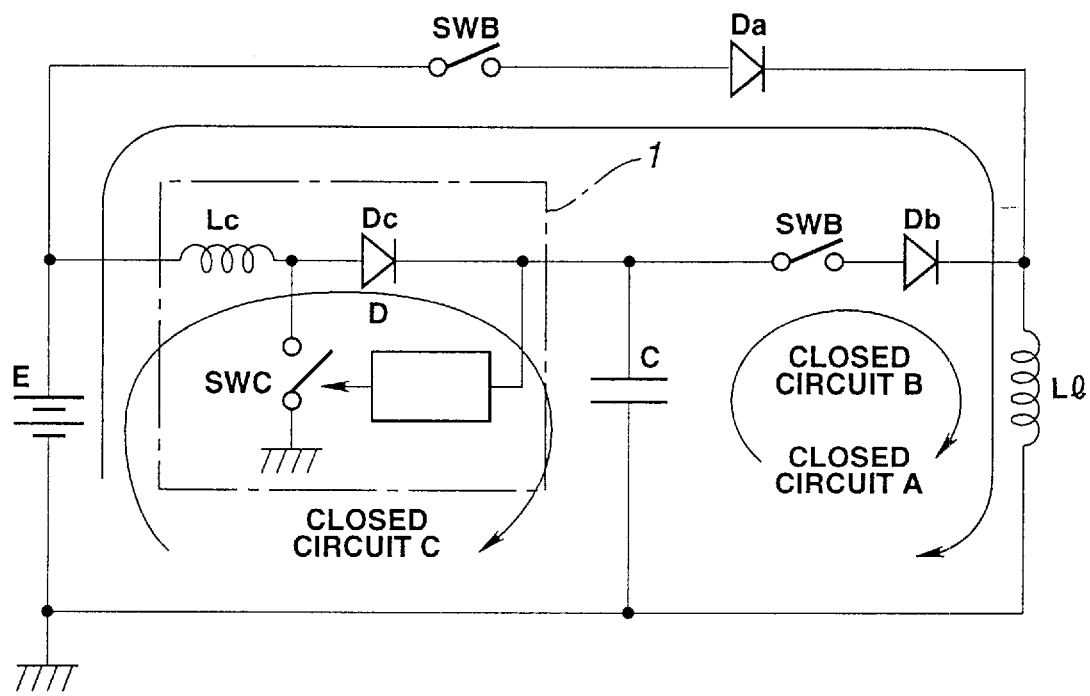
FIG. 31 is a circuit diagram of a prior art example of a DC—DC converter circuit.

Furthermore, in an inductive load drive circuit as described in the embodiments, conventionally, the surge current produced by self-induction of the load and generated when load drive was completed was detected, and a load operation monitoring device was employed to monitor normal termination of load operation. The monitor circuit 14 shown in FIG. 23 is an improvement on such a load operation monitoring device. Details of this monitoring circuit 14 are shown in FIG. 30.

The principle of operation of this circuit is that, after lapse of a time tp shown in FIG. 25 after the supply of the large load current by application of high voltage from DC—DC converter 1 on drive of the load a large negative surge voltage is generated by cut-off of this large current. A monitor circuit 14 inputs the terminal voltage of the load through Zener elements 142-1 to 142-4 for selective detection of negative voltage. When generation of the surge voltage is thus detected, the monitor circuit actuates a one-shot circuit 141 to output a monitor output ACK.

Since this monitor output ACK is output at a time tp after input of the drive signals, it has the advantage that the drive condition of the load can be detected at an earlier stage than in the case of the conventional arrangement, in which this signal is output at the time point where load drive terminates.

Also, with the objective of preventing the surge of negative voltage generated by termination of drive of the load being confused with the surge produced by cut-off of the large current, monitor circuit 14 in the drive circuit shown in FIG. 23 is provided in combination with switching means (mask switches) 144-1 to 144-4 that input the drive termination signal and isolate the outputs of Zener elements 142-1 to 142-4 for a fixed period after this input of the drive termination signal.

With such a construction, this monitor circuit 14 is able to monitor the drive condition of the load at an early stage after input of the drive signal of the load, and can prevent confusion with the time point of termination of the load drive. Thus it can accurately output a monitoring signal even in the case where the drive timings of the respective loads overlap as shown in FIG. 27 and FIG. 28.

In the configuration shown in FIG. 23, a semiconductor switch is typically employed as switching means 3 to switch the high voltage generated by the DC—DC converter 1 on or off with respect to the load. However, when employing a semiconductor switch for so-called high side switching as shown in FIG. 23, difficulties are experienced in the selection of a semiconductor switch suited for industrial applications. For example, in the case of a junction transistor switch, the pnp type of switch is suited to the construction of a high side switch, but, due to the internal structure of a pnp type switch, a switch having the necessary current characteristic and efficiency tends to be of large size and high cost. Also, although there are many switches of the npn type that are suitable in respect of current characteristic and efficiency, due to the need to provide a higher voltage than the high voltage generated by the DC—DC converter 1 in order to drive the base of such an npn switch, they suffer from the drawback that the power source for driving this base needs to have a certain level of current capacity.

In regard to this matter, a high voltage switch circuit employing a voltage drive element as in Japanese Patent Application No. H.6-098659 is advocated, but if such circuits are employed in respect of a large number of loads the construction becomes too complicated. Circuits possessing the property that, by inputting a trigger signal when the circuit is closed, as in an SCR element, the element itself maintains closure if the subsequent load current is continued are also available. However, with such elements, although the closure circuit is simplified and losses during closure are adequately small, it is necessary to provide a large amount of ancillary circuitry in order to open-circuit (extinguish) the element.

In the present invention, by using, as high voltage switching means 3, a switch element employing a high voltage drive transistor element or the like, that is capable of achieving cut off, and, by using as the means for distributing the output of this to a plurality of loads (high voltage means for distribution 8), a trigger-driven type element such as an SCR element, by combining both of these, an SCR-element extinguishing circuit is made unnecessary; furthermore, it becomes possible to share such switch devices that are capable of achieving cut off with a plurality of loads, thereby greatly simplifying the circuitry and enabling costs to be reduced.

Also, in FIG. 23, regarding the distributive switching means 6 for connecting the output of analogue constant-current circuit 4 in distributed fashion to the respective loads, when the output of DC—DC converter 1 is applied to the loads, this high voltage output of DC—DC converter 1 is applied to distributive switching means 6 in the opposite direction. Since analogue constant-current circuit 4 that is connected to the input of distributive switching means 6 is not designed to have high voltage applied to it in the opposite direction, as in the case of the output of an ordinary DC—DC converter 1, it was necessary to provide a reverse current prevention means such as a diode in series with distributive switching means 6. In the present invention, by adopting as the distributive switching means 6 an element that itself has a reverse current blocking characteristic, such as an SCR element, the circuit can be simplified and loss can be reduced.

INDUSTRIAL APPLICABILITY

As described above, with the present invention, by adopting a construction in which the coil that is employed for charging the capacitor in a DC—DC converter constituting the charging circuit of an inductive load drive device is a coil that is magnetized with greater energy density per unit area of the core by application of bias to the core of the coil by using a permanent magnet or electromagnet, if the same energy is to be obtained, this coil can be made of smaller size and lighter weight. Or, if a coil of the same size is to be employed, more energy can be obtained in a single switching cycle. Consequently, the charger circuit can be made of smaller size, lighter weight, and higher efficiency and, as a result, the inductive load drive device itself can be made of smaller size, lighter weight and higher efficiency.

Also, in the operation maintenance period of the inductive load, since, in contrast with the PWM system using conventional switching, the load current is controlled in analogue fashion, external radiation of noise can be enormously reduced. Furthermore, this control can be combined with use of a low-voltage power source so, even though analogue control is used, evolution of heat by the device can be kept to a very low level.

Furthermore, by making the circuitry relating to the DC—DC converter, analogue constant-current circuit, and high voltage switching circuit common to a plurality of load circuits as far as respectively possible, an inductive load drive device can be provided that can be applied to many kinds of applications without increasing the amount of circuit equipment.

We claim:

1. A DC—DC converter circuit having a power source and a coil provided with a magnetic core connected to the power source, in which a process that energy is accumulated on the magnetic core by applying the power source voltage to the coil and the energy accumulated on the magnetic core is then discharged to a load, is performed repeatedly, characterized in that the magnetic core of the coil is magnetically biased in a direction opposite to a direction of magnetization induced by an electric current supplied from the power source so that the magnetic energy accumulated on the coil is increased.

2. The DC—DC converter circuit according to claim 1, comprising the power source, a coil having a magnetic core and connected to the power source, switching means that opens and closes a closed circuit containing the power source and the coil, rectifying means whose one end is connected to the switching means, for preventing reverse current, and a capacitor connected in parallel with the switching means through the rectifying means, in which energy is accumulated on the coil by applying a voltage from the power source to the coil by closing the switching means, and the energy accumulated on the coil is accumulated on the capacitor through the rectifying means by opening the switching means with an arbitrarily determined timing and output, characterized in that the magnetic core of the coil is magnetically biased in a direction opposite to a magnetic field induced by an electric current supplied from the power source.

3. The DC—DC converter circuit according to claim 2, wherein the magnetic core comprises a permanent magnet and the magnetic core is magnetically biased by a magnetic field generated by the permanent magnet in a direction opposite to a direction of a magnetic flux induced by the current supplied from the power source.

4. The DC—DC converter circuit according to claim 2, wherein the magnetic core includes a biasing winding and the magnetic core is magnetically biased by supplying a desired current to the biasing winding from a constant-current source, in a direction opposite to a magnetic field induced by the current supplied from the power source.

5. The DC—DC converter circuit according to claim 1, comprising the power source, a first coil having a magnetic core and connected to the power source; switching means that opens and closes a closed circuit including the power source and the first coil; at least one second coil whose magnetic core is common with the first coil; rectifying means connected to one end of the second coils, for preventing reverse current; and capacitors respectively connected in parallel with the at least one second coil through the rectifying means, wherein a voltage from the power source is applied to the first coil by closing the switching means, causing energy to be accumulated on the magnetic core of the first coil, and the energy accumulated on the magnetic core is accumulated on the respective capacitors by currents induced in the second coils through the rectifying means when the switching means is opened with an arbitrarily determined timing, and is output, characterized in that the magnetic core is magnetically biased in a direction opposite to the magnetic field induced by an electric current supplied from the power source whereby the magnetic energy accumulated on the first coil is increased.

6. The DC—DC converter circuit according to claim 5, wherein the magnetic core comprises a permanent magnet, and the magnetic core is biased magnetically a the magnetic field generated by the permanent magnet in a direction opposite to the magnetic field induced by the current supplied by the power source.

7. The DC—DC converter circuit according to claim 5, wherein the magnetic core includes a biasing winding and the magnetic core is magnetically biased by supplying a desired current to the biasing winding from a constant-current source, in a direction opposite to a magnetic field induced by the current supplied from the power source.

8. The DC—DC converter circuit according to claim 1, comprising the power source, a coil connected to the power source and having a magnetic core, switching means that opens and closes a closed circuit containing the power source and an entire winding or a partial winding of the coil, rectifying means connected to one end of the entire winding or a partial winding of the coil, for preventing reverse current, and a capacitor connected in parallel with the entire winding or partial winding of the coil through the rectifying means, wherein closure of the switching means applies the power source voltage to the entire winding or partial winding of the coil, thereby accumulating energy on the magnetic core of the coil, and wherein, by opening the switching means with an arbitrarily determined timing, energy accumulated on the magnetic core is accumulated on at least one of the capacitors as electrical energy induced in the entire winding or partial winding at least one location of the coil through the rectifying means and is outputted, characterized in that the magnetic core is magnetically biased in a direction opposite to the magnetic field induced by the current supplied from the power source whereby the magnetic energy accumulated in the coil is increased.

9. The DC—DC converter circuit according to claim 8, wherein the magnetic core comprises a permanent magnet, and the magnetic core is biased magnetically a the magnetic field generated by the permanent magnet in a direction opposite to the magnetic field induced by the current supplied by the power source.

10. The DC—DC converter circuit according to claim 8, wherein the magnetic core includes a biasing winding and the magnetic core is magnetically biased by supplying a desired current to the biasing winding from a constant-current source, in a direction opposite to a magnetic field induced by the current supplied from the power source.

11. The DC—DC converter circuit according to claim 1, comprising the power source, a first coil connected to the power source and having a magnetic core, switching means that opens and closes a closed circuit containing the power source and the first coil, first rectifying means connected to at least one end of the switching means, for preventing reverse current, a first capacitor connected in parallel with the switching means through the first rectifying means, a second coil connected to the first capacitor, second rectifying means preventing reverse current of the current flowing through the second coil, and a second capacitor connected to the second coil through the second rectifying means, wherein closure of the switching means applies power source voltage to the first coil so that energy is accumulated on the magnetic core of the coil and, by opening the switching means with an arbitrarily determined timing, the energy accumulated on the first coil is accumulated on the first capacitor through the first rectifying means and the energy that is output from the first coil, including the charge on the first capacitor is accumulated on the second capacitor through the second coil and second rectifying means and is output, characterized in that the magnetic core of the first coil is magnetically biased in a direction opposite to a magnetic field induced by an electric current supplied from the power source whereby the magnetic energy accumulated on the coil is increased.

12. The DC—DC converter circuit according to claim 11, wherein the magnetic core of the first coil comprises a permanent magnet, and the magnetic core is magnetically biased by means of the magnetic field generated by the permanent magnet in the opposite direction to the magnetic field induced by the current supplied from the power source.

13. The DC—DC converter circuit according to claim 11, wherein the magnetic core of the first coil includes a biasing winding, and, by supplying a desired electric current from a constant-current source to the biasing winding, the magnetic core is magnetically biased by means of the magnetic field generated by the winding in the opposite direction to the magnetic field induced by the current supplied from the power source.

14. The DC—DC converter circuit according to claim 1, comprising the power source, a first coil having a magnetic core and connected to the power source, switching means that opens and closes the closed circuit containing the power source and the first coil, at least one second coil whose magnetic core is common to the first coil, first rectifying means connected to one end of the second coil, for preventing reverse current, first capacitors respectively connected in parallel with the second coils through the first rectifying means, a third coil connected to at least one of the first capacitors, second rectifying means that prevent reverse current of the current flowing through the third coil, and a third capacitor connected to the third coil through the second rectifying means, wherein, by closing the switching means, the power source voltage is applied to the first coil, thereby accumulating energy on the magnetic core of the first coil; the energy accumulated on the magnetic core by opening the switching means with timing that may be determined arbitrarily is accumulated on the respective first capacitors by means of the current induced in the second coil through the first rectifying means; and energy output from the second coil including the charge of the first capacitor is accumulated on the third capacitor through the third coil and second rectifying means, characterized in that the magnetic core is magnetically biased in the direction opposite to the magnetic field induced by the current supplied from the power source whereby the magnetic energy accumulated on the first coil is increased.

15. The DC—DC converter circuit according to claim 14, wherein the magnetic core of the first coil comprises a permanent magnet, and the magnetic core is magnetically biased by means of the magnetic field generated by the permanent magnet in the opposite direction to the magnetic field induced by the current supplied from the power source.

16. The DC—DC converter circuit according to claim 14, wherein the magnetic core of the first coil includes a biasing winding, and, by supplying a desired electric current from a constant-current source to the biasing winding, the magnetic core is magnetically biased by means of the magnetic field generated by the winding in the opposite direction to the magnetic field induced by the current supplied from the power source.

17. A DC—DC converter circuit comprising the power source, a first coil connected to the power source and having a magnetic core, switching means that opens and closes a closed circuit including the power source and an entire winding or a partial winding of the first coil, first rectifying means connected to one end of the entire winding or partial winding of the coil, for preventing reverse current, first capacitors connected in parallel with the entire winding or partial winding of the coil through the first rectifying means, a second coil connected to at least one of the first capacitors, second rectifying means preventing reverse current of the current flowing through the second coil, and second capacitors connected to the second coil through the second rectifying means, wherein closure of the switching means applies the power source voltage to the entire winding or partial winding of the coil, causing energy to be accumulated on the magnetic core of the coil, and wherein the energy accumulated on the magnetic core by opening of the switching means with an arbitrarily determined timing is accumulated on at least one of the first capacitors as electrical energy induced in the entire winding or at least one location of the partial winding of the first coil through the first rectifying means, and the energy that is output from the first coil, including the charge of the first capacitors, through the second coil and second rectifying means, is accumulated on the second capacitors and output, characterized in that the magnetic core of the first coil is magnetically biased in the opposite direction to the magnetic field induced by the current supplied from the power source so that the magnetic energy accumulated on the first coil is increased.

18. The DC—DC converter circuit according to claim 17, wherein the magnetic core of the first coil comprises a permanent magnet, and the magnetic core is magnetically biased by means of the magnetic field generated by the permanent magnet in the opposite direction to the magnetic field induced by the current supplied from the power source.

19. The DC—DC converter circuit according to claim 17, wherein the magnetic core of the first coil includes a biasing winding, and, by supplying a desired electric current from a constant-current source to the biasing winding, the magnetic core is magnetically biased by means of the magnetic field generated by the winding in the opposite direction to the magnetic field induced by the current supplied from the power source.

20. An inductive load drive device comprising a power source, a DC—DC converter circuit as set forth in claim 1 that generates a voltage higher than the power source and is connected to the power source, and high voltage switching means for applying to an inductive load the output of the DC—DC converter circuit.

21. An inductive load drive device comprising:
 a power source,
 a DC—DC converter circuit according to claim 1 that is connected to the power source and that generates a voltage higher than the power source voltage, high voltage switching means that switches on or off the output of the DC—DC converter circuit,
 a logical summation circuit that is capable of driving the high voltage switching means in response to any of the at least one high voltage switch drive signals inputted thereinto,
 at least one high voltage distributive switching means for connecting the output of the high voltage switching means to at least one inductive load,
 a low voltage power source connected to the power source and that outputs a variable output voltage at or below the power source voltage,
 load current detecting means that detects load current flowing in the inductive load,
 at least one analogue constant-current output circuit connected to the low voltage power source, that inputs a holding current value signal and a load current feedback signal from the load current detecting means, and that controls the load current to a value matching the holding current value signal,
 a low voltage power source adjustment circuit that inputs the voltage drop amount of output means of the analogue constant-current output circuit and that generates a signal to lower the output voltage of the low voltage power source circuit if the voltage drop amount exceeds a prescribed value,
 at least one low voltage distributive switching means for connecting the output of the analogue constant-current output circuit to the at least one inductive load,
 at least one surge absorption means that absorbs the self-induction energy of the load generated when the drive current of the at least one inductive load is reduced, and
 a signal processing circuit that inputs at least one load drive signal and, in respect of the respective load drive signals, during a prescribed fixed period from a time point signifying the commencement of the load drive in question, outputs a high voltage switch drive signal for driving the high voltage switching means and a drive signal of the high voltage distributive switching means for connecting the output of the high voltage switching means to the load that is to be driven, which is determined by the load drive signal and, during a period for which the load drive signal that is input signifies continuance of load drive, outputs a prescribed holding current value signal to the analogue constant-current output circuit and, concurrently, outputs a drive signal of the low voltage distributive switching means for connecting the output of the analogue constant-current output circuit to the load that is to be driven, which is determined in accordance with the load drive signal.

22. The inductive load drive device according to claim 21, wherein the load current detecting means is a current detection resistor, and bypass means are provided in parallel with the current detection resistor and that have a constant-voltage characteristic that is non-conductive when the voltage across both terminals of the current detection resistor is below a prescribed voltage and that conducts when the voltage across both terminals of the current detection resistor exceeds the prescribed voltage, whereby, when a current of more than the prescribed current exceeding a current value matching the holding current value signal flows in the load to which the current detection resistor is connected by the high voltage switching means and the high voltage distributive switching means, due to the voltage generated by the current at the two terminals of the current detection resistor exceeding the prescribed voltage of the bypass means, the load current is branched to the bypass means, thereby lowering the heat generated by the current detection resistor.

23. The inductive load drive device according to claim 21, wherein, for cases where, due to drive sequence of the inductive loads, drive times of the high voltage switching means do not overlap, the DC—DC converter circuit and the high voltage switching means are made common and, for cases where the periods for which drive of the corresponding loads continues do not overlap, the analogue constant-current output circuit and the load current detecting means are made common.

24. An inductive load drive device comprising a monitor circuit that inputs the drive-side terminal voltage of an inductive load and, when a drive current of the inductive load is cut off or rapidly decreased, outputs an operation confirmation signal by detecting a surge current generated by self-induction of the inductive load, wherein the monitor circuit outputs a confirmation signal that detects a surge produced when a large current flowing in the load due to high voltage applied in an initial period of drive of the load is rapidly decreased, characterized in that, in order to prevent confusion of the surge with a surge produced when the load drive is terminated, the operating confirmation signal is masked by using a control signal indicative of the termination of drive of the inductive load.

25. The inductive load drive device according to claim 21, wherein the high voltage switching means comprises an element such as a transistor that is capable of being cut-off in response to a control input, and the high voltage distributive switching means comprises an element such as an SCR having a self-holding function.

26. The inductive load drive device according to claim 21, wherein the low voltage distributive switching means comprises an element having a self-holding function of conduction, such as an SCR.

27. A DC—DC converter circuit having a power source and a coil provided with a magnetic core connected to the power source, in which a process that energy is accumulated on the magnetic core by applying the power source voltage to the coil and the energy accumulated on the magnetic core is then discharged to a load, is performed repeatedly, characterized in that the magnetic core of the coil is magnetically biased in a direction opposite to a direction of magnetization induced by an electric current supplied from the power source so that the magnetic energy accumulated on the coil is increased, wherein the magnetic core comprises a permanent magnet and the magnetic core is magnetically biased by a magnetic field generated by the permanent magnet in a direction opposite to a direction of a magnetic flux induced by the current supplied from the power source.

\* \* \* \* \*